(12) United States Patent
Das et al.

(10) Patent No.: US 11,767,174 B2
(45) Date of Patent: Sep. 26, 2023

(54) SYSTEM AND METHOD FOR CONTACTLESS MONITORING OF PERFORMANCE IN AN INDEPENDENT CART SYSTEM

(71) Applicant: Rockwell Automation Technologies, Inc., Mayfield Heights, OH (US)

(72) Inventors: Jadav Das, Lake Grove, NY (US); Robert H. Schmidt, Mequon, WI (US); Yuhong Huang, Acton, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 156 days.

(21) Appl. No.: 17/355,714

(22) Filed: Jun. 23, 2021

(65) Prior Publication Data

US 2022/0411196 A1    Dec. 29, 2022

(51) Int. Cl.
    *B65G 43/00*     (2006.01)
    *B65G 17/32*     (2006.01)

(52) U.S. Cl.
    CPC ............. *B65G 43/00* (2013.01); *B65G 17/32* (2013.01); *B65G 2203/041* (2013.01); *B65G 2203/044* (2013.01); *B65G 2203/045* (2013.01)

(58) Field of Classification Search
    CPC .. B65G 43/00; B65G 17/32; B65G 2203/041; B65G 2203/044; B65G 2203/045
    USPC ...................................................... 198/502.3
    See application file for complete search history.

(56) References Cited

U.S. PATENT DOCUMENTS

| | | | |
|---|---|---|---|
| 5,394,233 A | 2/1995 | Wang | |
| 7,116,426 B2 | 10/2006 | Lal et al. | |
| 8,485,037 B1 | 7/2013 | Takacs et al. | |
| 8,621,931 B2 | 1/2014 | Phua et al. | |
| 9,870,002 B1* | 1/2018 | Holmberg | G05B 19/00 |
| 10,261,491 B1* | 4/2019 | Dunham | G05D 1/0016 |
| 10,586,082 B1 | 3/2020 | Tang | |
| 2002/0024331 A1 | 2/2002 | Lewis et al. | |

(Continued)

FOREIGN PATENT DOCUMENTS

WO      2020/201223 A1      10/2020

OTHER PUBLICATIONS

Jiang, Zuo-dong, A Monorail Conveying System, Nov. 6, 2020, China, CN111891668A (Year: 2020).*

(Continued)

*Primary Examiner* — Gene O Crawford
*Assistant Examiner* — Lester Ill Rushin
(74) *Attorney, Agent, or Firm* — Boyle Fredrickson, S.C.

(57) ABSTRACT

A contactless monitoring system detects operating performance of movers in an independent cart system. A contactless sensor is provided on an actuator to automatically track a mover as it travels along the track. The sensor includes a transmitter configured to transmit a signal and a receiver configured to receive the signal after it is reflected off the mover. The actuator may be configured to mover the sensor in a single axis or in multiple axes of motion. As a mover travels along the track, the sensor transmits a signal towards the mover and detects the signal after it has been reflected off the mover. A controller may synchronize motion of the actuator with motion of the mover, such that the sensor may continually transmit the signal off the mover for at least a portion of the travel by the mover along the track.

19 Claims, 16 Drawing Sheets

(56) References Cited

U.S. PATENT DOCUMENTS

2013/0060524 A1 3/2013 Liao
2016/0152416 A1 6/2016 Staab et al.
2019/0249980 A1 8/2019 Tahir et al.
2019/0383939 A1* 12/2019 Mori .................. G06T 7/20

OTHER PUBLICATIONS

Mori, JP-4461199-B1, Device for Measuring Distance Between Conveyance Trolleys Used During Manufacture of Semiconductor Device, Identifies Whether Light Reflected From Retroreflection Element is Correlated With Distance and Scanning Angle of Light, May 12, 2010, Japan JP4461199 (Year: 2010).*
JP4461199B1 (Year: 2010).*
CN-111891668-A (Year: 2020).*
Extended European Search Report dated Nov. 30, 2022; Application No./Patent No. 22180413.1-1017/4108603—(8) pages.
P. Castellini; "Vibration measurements by tracking laser doppler vibrometer on automotive compoinents"; Shock and Vibration 9 (2002) IOS Press—(24) pages.

* cited by examiner

SYSTEM AND METHOD FOR CONTACTLESS MONITORING OF PERFORMANCE IN AN INDEPENDENT CART SYSTEM

BACKGROUND INFORMATION

The subject matter disclosed herein relates to a system and method for real-time monitoring of performance in an independent cart system. More specifically, a contactless sensor is provided to monitor carts as they travel along a track in the independent cart system. The sensor may track each mover to determine operating characteristics, such as, speed, position, or vibration of the carts at particular locations or as the cart moves along the track.

Motion control systems utilizing independent carts and linear motors can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled carts, also referred to herein as "movers", each supported on a track for motion along the track. The track is made up of a number of track segments, and a linear drive system controls operation of the movers, causing the movers to travel along the track. Sensors may be spaced at fixed positions along the track and/or on the movers to provide information about the position and speed of the movers.

Numerous differences between different movers or differences in a single mover over time may impact how a mover travels along the track. Variations between movers due, for example, to manufacturing tolerances may result in differences in physical orientation of a location that is intended to be the same location on two different movers. Further, wear in bearings or rollers over time may increase variations between different movers or change orientation of a single mover over time. Wear on the track, such as a dent on a rail, or varying transition distances between track segments may further impact how a mover travels along the track. As still another potential difference, variations in loading on different movers or on the same mover during different runs along the same length of track may cause variations in the orientation of a single mover on different runs or between different movers during a single pass along the same length of track.

Knowledge of these variations in performance can assist in maintenance of the independent cart system. Initial knowledge of the performance of movers can be stored and compared to subsequent performance to detect wear in the mover. Comparing operation of one mover to another mover can detect a potential manufacturing defect or damage to one of the movers. Tracking operation of the mover as it travels along the track can detect variations in the track surface. Such performance information for movers as they travel along the track may be provided to technicians to determine when maintenance is required on a mover or on a track segment.

Obtaining performance information in an independent cart system, however, is not without certain challenges. As track systems grow in size and complexity, the number of movers on a track is increasing. The length of travel is similarly increasing as well as the complexity of track geometry including, for example, switches or multiple branches along which a mover may travel. Individual movers often lack power on the mover, having passive drive components such as permanent magnets mounted to each mover. Wired connections to individual movers to obtain performance information is not practical when the length of travel increases or when a mover must be able to travel between different paths. Batteries mounted on the mover may provide limited power but must be configured to power both sensors and wireless transmitters to transfer sensed data from the mover. Sensors and the circuits to support wireless communication add cost to each mover in the system. The batteries must be maintained and periodically replaced. Further, the volume of potential data being collected as the increasing number of movers travel along longer tracks may require substantial investment in wireless communications infrastructure.

Thus, it would be desirable to provide a sensor located off board of the movers that may provide contactless monitoring of operating performance of the movers.

BRIEF DESCRIPTION

According to one embodiment of the invention, an apparatus for monitoring performance in an independent cart system includes a sensing device, an actuator, and a controller. The sensing device is configured to transmit a signal toward at least one mover as the at least one mover travels along a track of the independent cart system, receive the signal reflected from the at least one mover, and generate a feedback signal corresponding to the received signal. The actuator is operatively connected to the sensing device to move the sensing device in at least one axis of motion, and the controller is operative to control operation of the actuator in the at least one axis of motion such that the actuator moves the sensing device in coordination with the at least one mover as the at least one mover travels along the track.

According to another embodiment of the invention, a method for monitoring performance in an independent cart system includes receiving a signal at a sensing device and generating a feedback signal at the sensing device corresponding to the received signal. The signal corresponds to at least one mover as the at least one mover travels along a track of the independent cart system. An actuator, operatively connected to a sensing device, is controlled to move the sensing device in at least one axis of motion, and the actuator moves the sensing device in coordination with the at least one mover as the at least one mover travels along the track.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
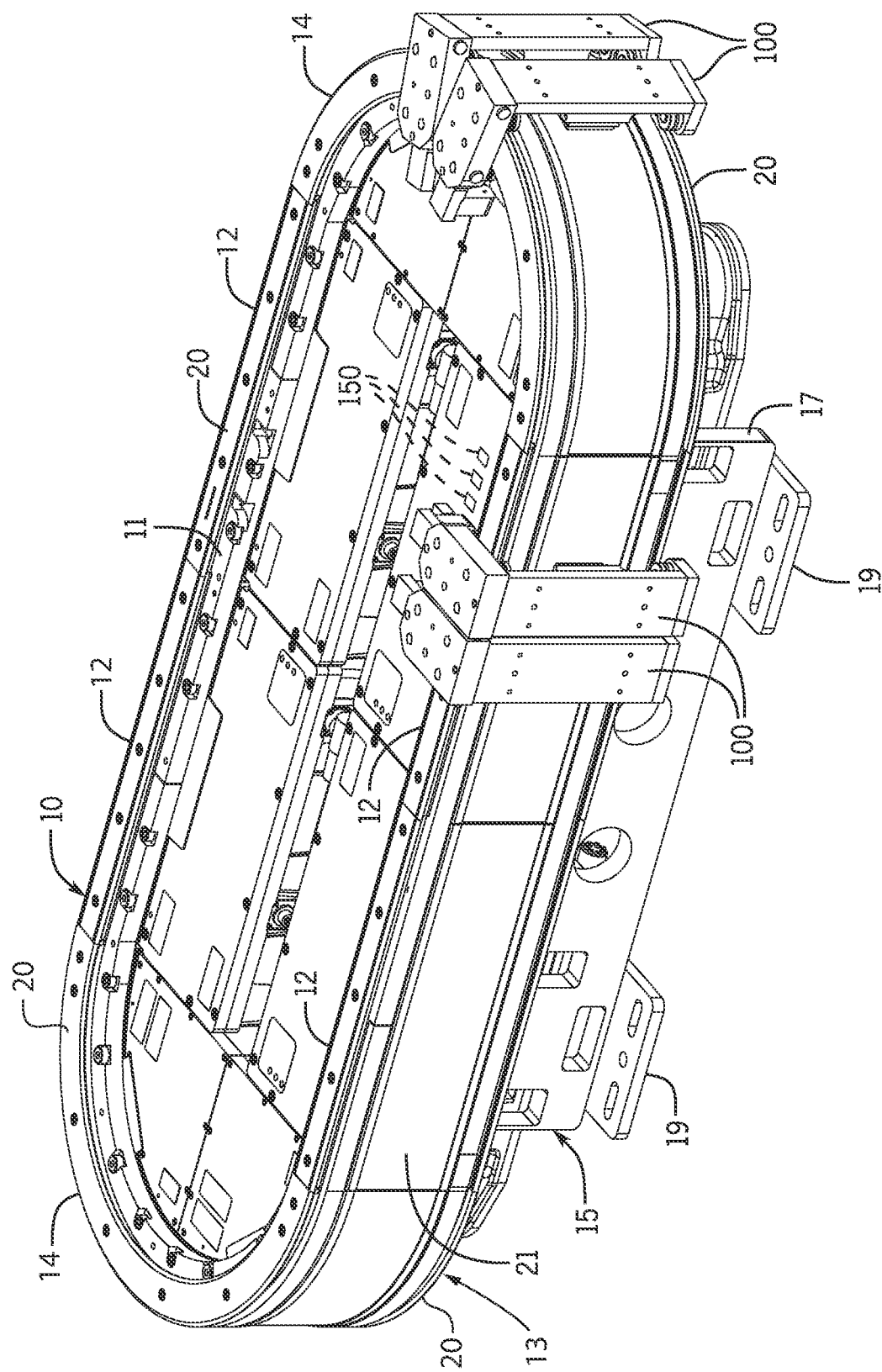
FIG. 1 is a perspective view of an exemplary independent cart system incorporating multiple movers travelling along a closed curvilinear track according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a system and method of contactless monitoring of operating performance of movers in an independent cart system. A contactless sensor is provided on an actuator to automatically track a mover as it travels along the track. The contactless sensor may be configured to detect light, sound, images, heat, microwaves, or any other suitable waveform that may be reflected off of the mover. The sensor includes a transmitter configured to transmit a signal and a receiver configured to receive the signal after it is reflected off the mover. The actuator may be configured to move the sensor in a single axis or in multiple axes of motion. As a mover travels along the track, the sensor transmits a signal, such as a laser beam or an ultrasonic beam towards the mover and detects the signal after it has been reflected off the mover. A controller may synchronize motion of the actuator with motion of the mover, such that the sensor may continually transmit the signal off the mover for at least a portion of the travel by the mover along the track. It is contemplated that the actuator may be mounted in a fixed location and pivot or rotate in one axis or multiple axes to move the sensor. Optionally, the actuator may be a mobile platform configured to move the sensor as it tracks operation of the mover.

Figure 2:
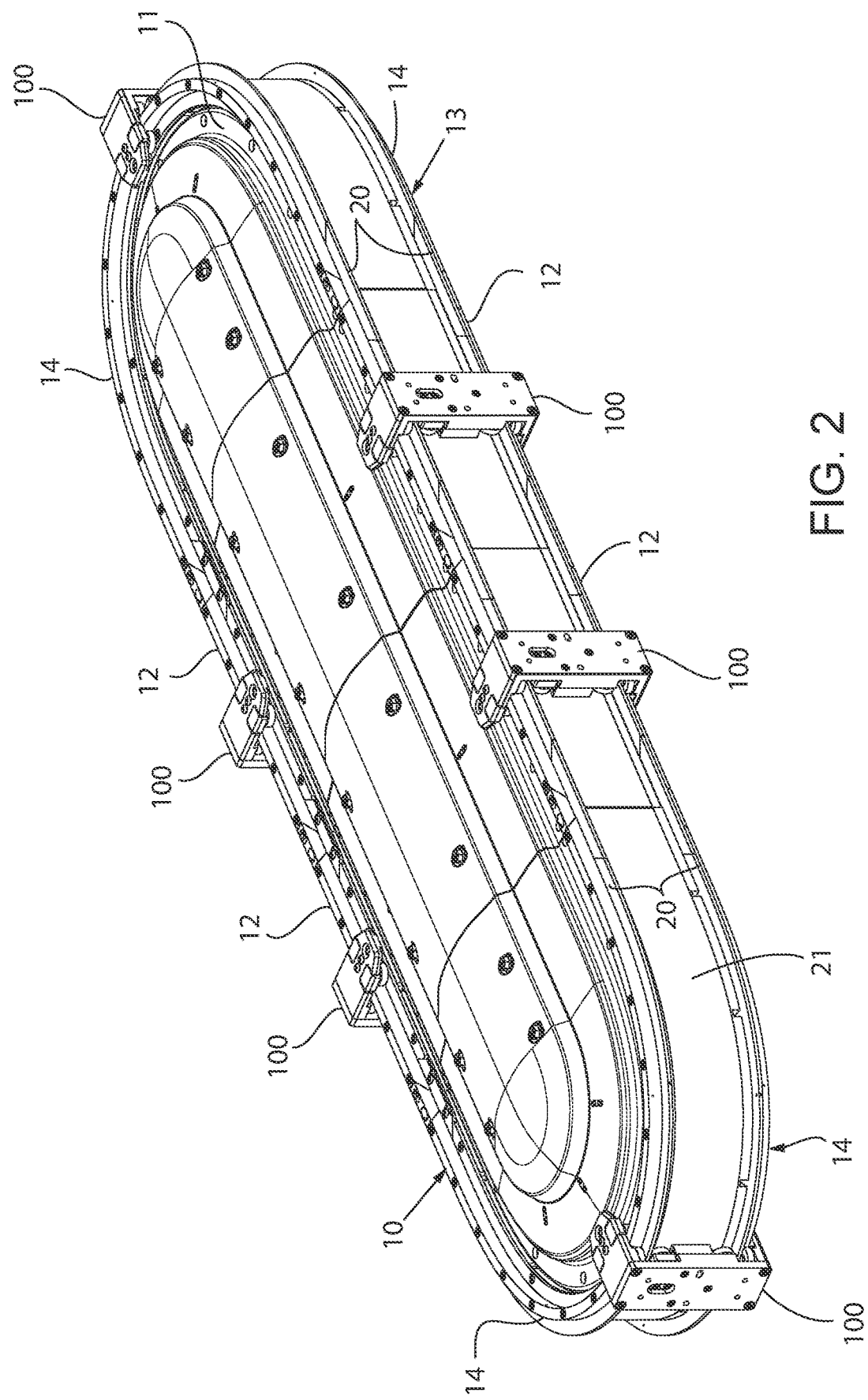
FIG. 2 is a perspective view of an exemplary independent cart system incorporating multiple movers travelling along a closed curvilinear track according to another embodiment of the present invention.
Figure 3:
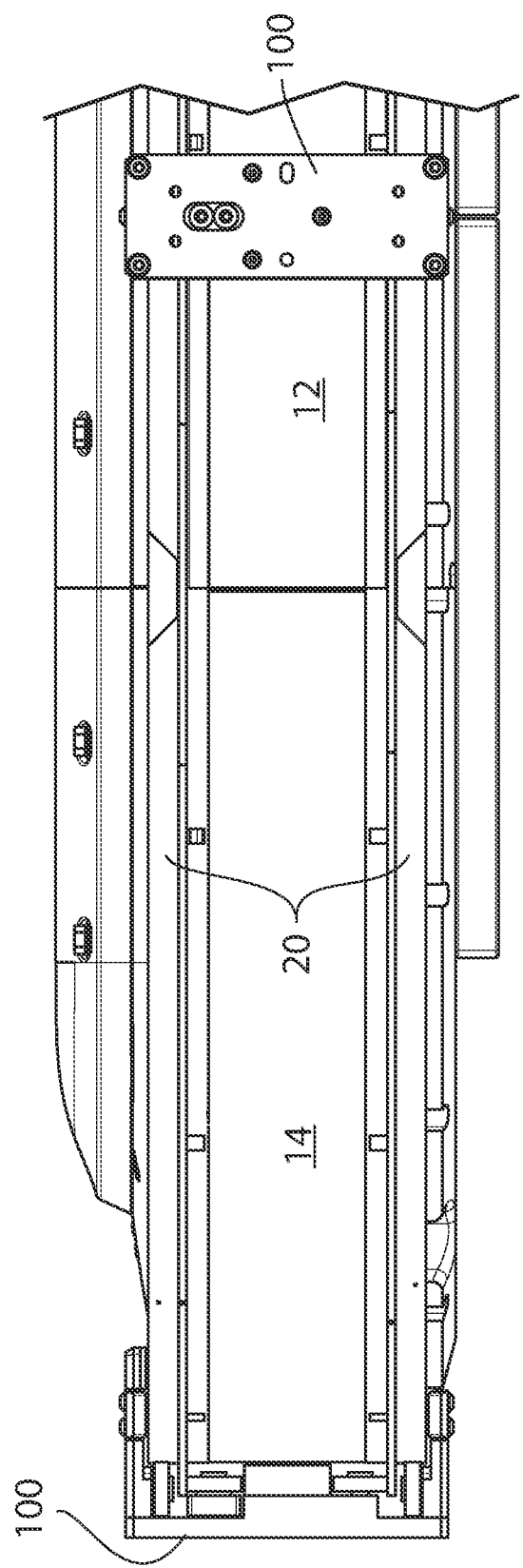
FIG. 3 is a partial side elevation of the independent cart system of FIG. 2.
Figure 4:
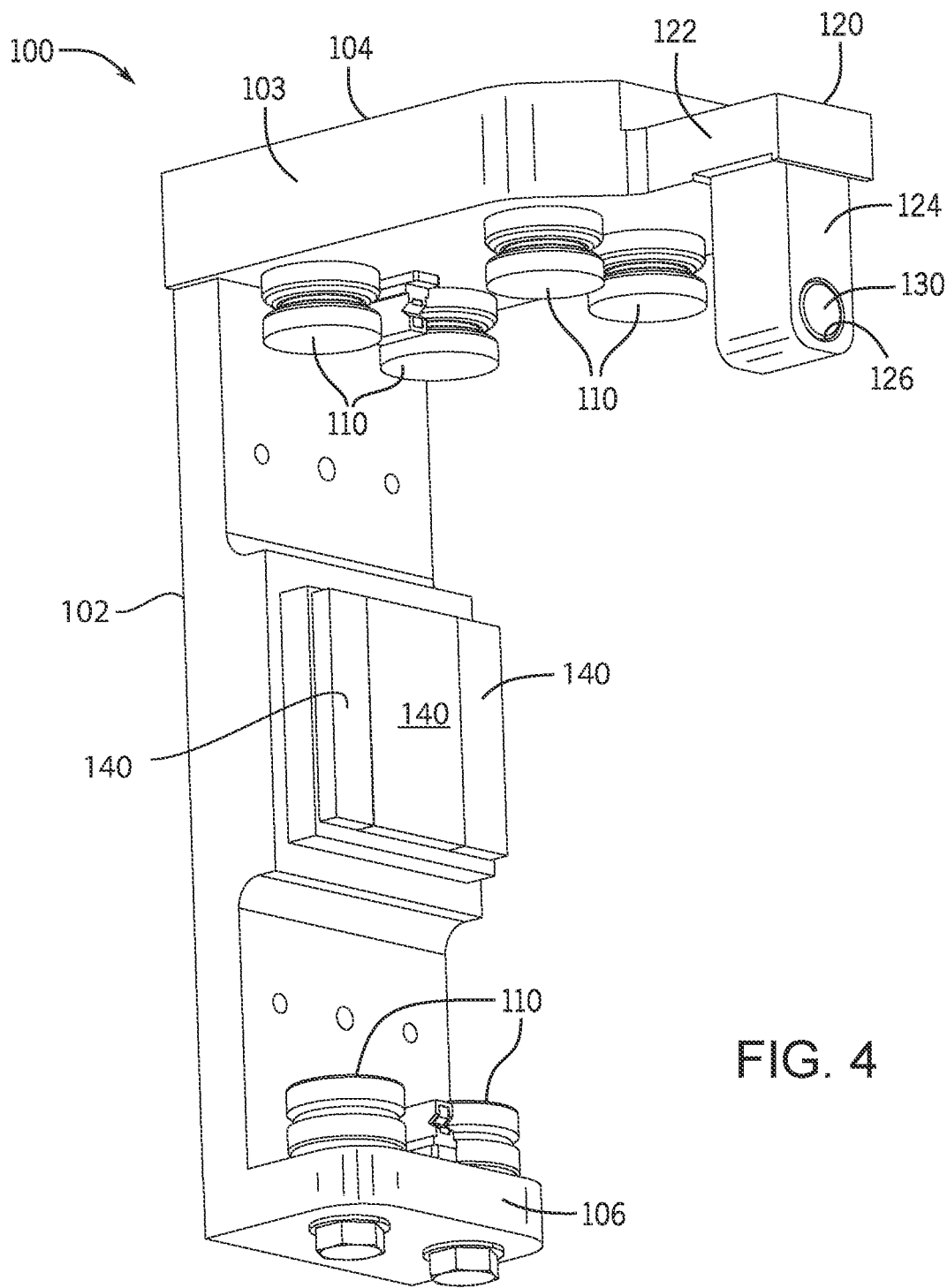
FIG. 4 is a perspective view of a mover from the transport system of FIG. 1.

Turning initially to FIGS. 1-3, two embodiments of an exemplary transport system for moving articles or products are illustrated. The transport system includes a track 10 made up of multiple segments 12, 14. According to the illustrated embodiments, the segments define a generally closed loop supporting a set of movers 100 movable along the track 10. The illustrated tracks 10 each include four straight segments 12 with two straight segments 12 located along each side of the track and spaced apart from the other pair. The tracks 10 also include four curved segments 14 where a pair of curved segments 14 is located at each end of the track 10 to connect the pairs of straight segments 12. The four straight segments 12 and the four curved segments 14 form a generally oval track and define a closed path over which each of the movers 100 may travel. It is understood that track segments of various sizes, lengths, and shapes may be connected together to form a track 10 without deviating from the scope of the invention.

In FIG. 1, the track 10 is oriented in a horizontal plane and supported above the ground by a base 15 extending vertically downward from the track 10. The base 15 includes a pair of generally planar support plates 17, located on opposite sides of the track 10, with mounting feet 19 on each support plate 17 to secure the track 10 to a surface. In FIG. 2, the track 10 is shown without a base. It is contemplated that the tracks 10 may be installed in different orientations, such as sloped or vertical, and include different shaped segments including, but not limited to, straight segments, inward bends, outward bends, up slopes, down slopes and various combinations thereof. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. The movers 100 will travel along the track and take various orientations according to the configuration of the track 10 and the relationships discussed herein may vary accordingly.

Each track segment 12, 14 includes a number of independently attached rails 20 on which each mover 100 runs. According to the illustrated embodiments, rails 20 extend generally along the outer periphery of the track 10. A first rail 20 extends along an upper surface 11 of each segment and a second rail 20 extends along a lower surface 13 of each segment. It is contemplated that each rail 20 may be a singular, molded or extruded member or formed from multiple members. It is also contemplated that the cross section of the rails 20 may be circular, square, rectangular, or any other desired cross-sectional shape without deviating from the scope of the invention. The rails 20 generally conform to the curvature of the track 10 thus extending in a straight path along the straight track segments 12 and in a curved path along the curved track segments 14. The rails 20 may be thin with respect to the dimensions of the track 10 and span only a partial width of the surface of the track 10 on which it is attached.

Figure 5:
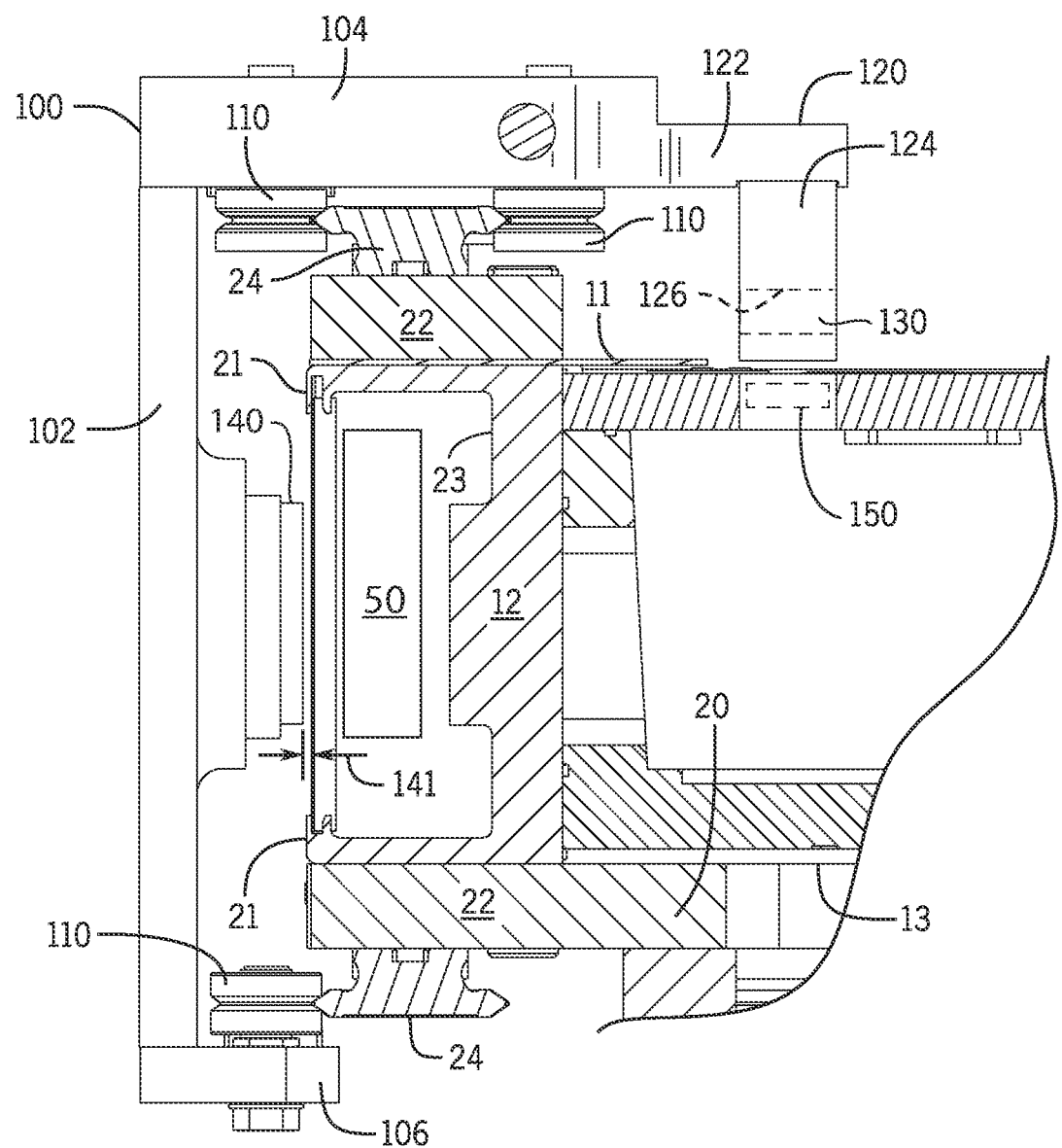
FIG. 5 is a partial sectional view of the transport system of FIG. 1.
Figure 6:
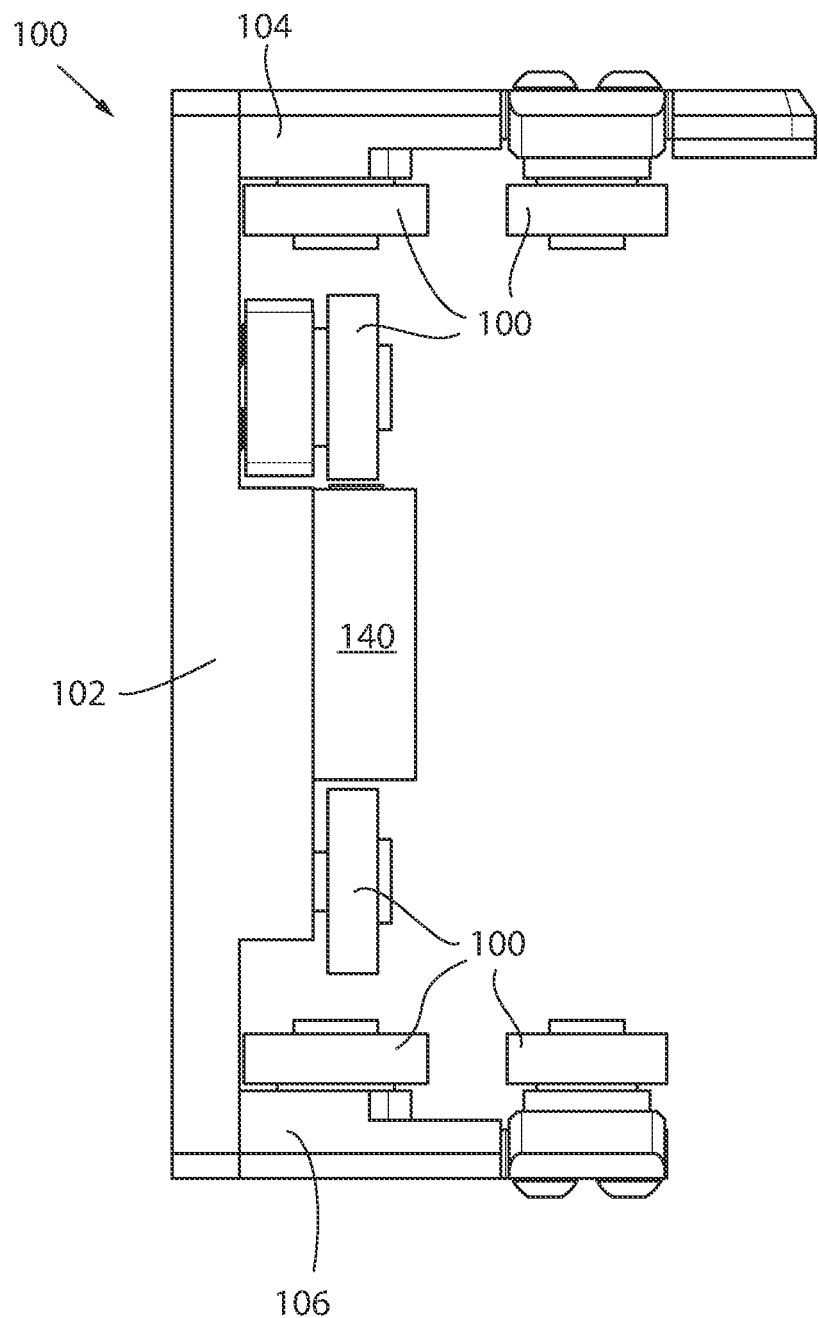
FIG. 6 is a side elevational view of a mover from the transport system of FIG. 2.

With reference also to FIG. 5, a first embodiment of the rail 20 includes a base portion 22 mounted to the track segment and a track portion 24 along which the mover 100 runs. Each mover 100 includes complementary rollers 110 to engage the track portion 24 of the rail 20 for movement along the track 10. Each side of the track portion 24 is wedge-shaped and each roller 110 includes a complementary groove configured to receive the wedge-shaped side of the track portion.

Figure 7:
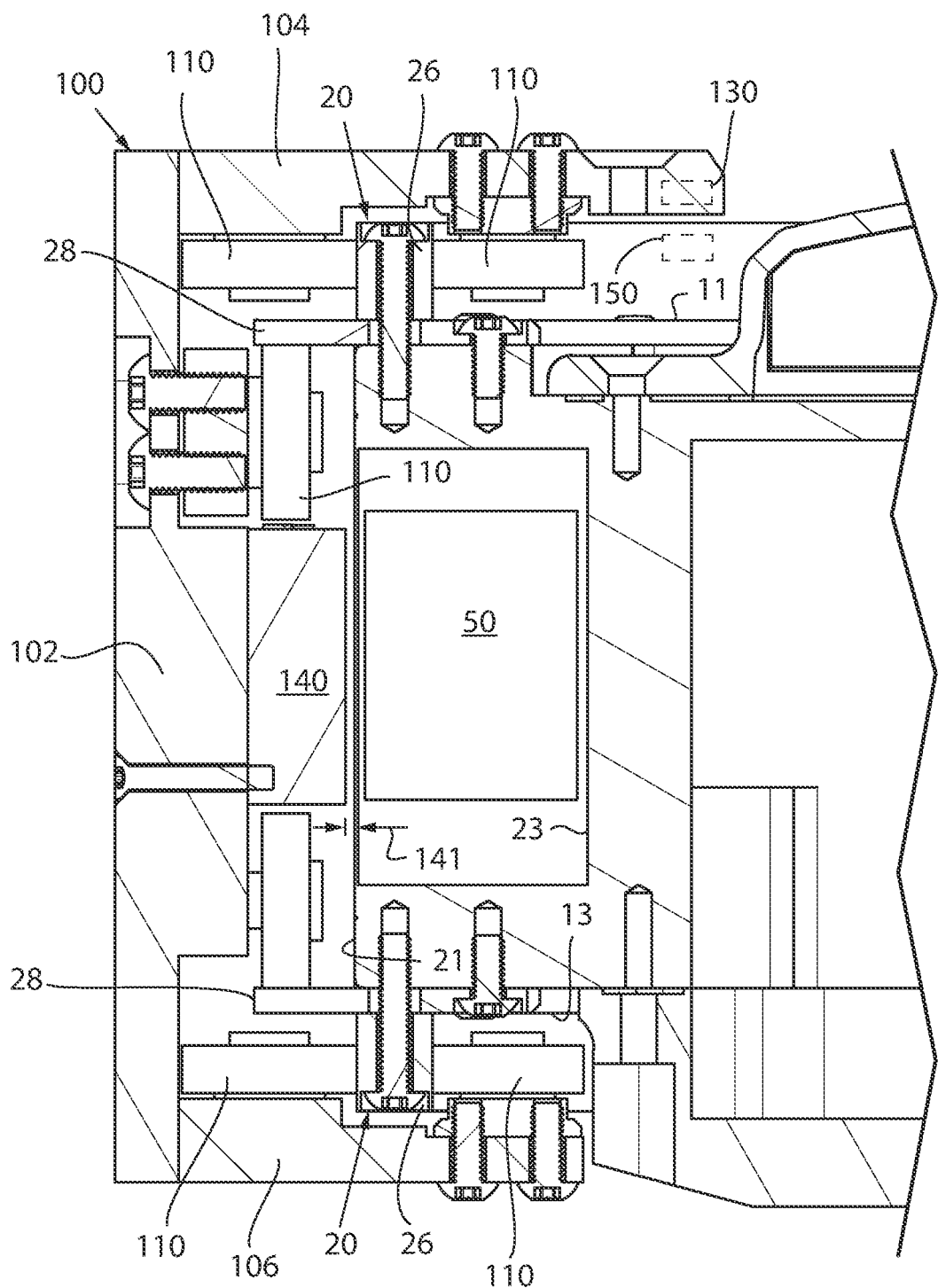
FIG. 7 is a partial sectional view of the transport system of FIG. 2.

With reference also to FIG. 7, a second embodiment of the rail 20 includes two track portions 26, 28, where a first track portion 26 is generally u-shaped and a second track portion 28 is generally rectangular. The first track portion 26 of the upper rail 20 is positioned as an inverted "u" on the top surface 11 of the track and first and second rollers 110 engage each side of the first track portion 26 of the upper rail. The second track portion 28 of the upper rail 20 protrudes from the side of the track segment orthogonally to the orientation of the first track portion 26. A third roller 110 engages one surface of the second track portion 28 of the upper rail. The first track portion 26 of a lower rail 20 is oriented as a non-inverted "u" on the lower surface 13 of the track and fourth and fifth rollers 110 engage each side of the first track portion 26 of the lower rail. The second track portion 28 of the lower rail 20 protrudes from the side of the track segment orthogonally to the orientation of the first track portion 26, and a sixth roller 110 engages one surface of the second track portion 28 of the lower rail.

One or more movers 100 are mounted to and movable along the rails 20 on the track 10. With reference again to FIG. 5, a first embodiment of an exemplary mover 100 is illustrated. Each mover 100 includes a side member 102, a top member 104, and a bottom member 106. The side member 102 extends for a height at least spanning a distance between the rail 20 on the top surface 11 of the track 10 and the rail 20 on the bottom surface 13 of the track 10 and is oriented generally parallel to a side surface 21 when mounted to the track 10. The top member 104 extends generally orthogonal to the side member 102 at a top end of the side member 102 and extends across the rail 20 on the top surface 11 of the track 10. The top member 104 includes a first segment 103, extending orthogonally from the side member 102 for the width of the rail 20, which is generally the same width as the side member 102. A set of rollers 110 are mounted on the lower side of the first segment 103 and are configured to engage the track portion 24 of the rail 20 mounted to the upper surface 11 of the track segment. According to the illustrated embodiment two pairs of rollers 110 are mounted to the lower side of the first segment 103 with a first pair located along a first edge of the track portion 24 of the rail and a second pair located along a second edge of the track portion 24 of the rail 20. The first and second edges and, therefore, the first and second pairs of rollers 110 are on opposite sides of the rail 20 and positively retain the mover 100 to the rail 20. The bottom member 106 extends generally orthogonal to the side member 102 at a bottom end of the side member 102 and extends for a distance sufficient to receive a third pair of rollers 110 along the bottom of the mover 100. The third pair of rollers 110 engage an outer edge of the track portion 24 of the rail 20 mounted to the lower surface 13 of the track segment. Thus, the mover 100 rides along the rails 20 on the rollers 110 mounted to both the top member 104 and the bottom member 106 of each mover 100. The top member 104 also includes a second segment 120 which protrudes from the first segment 103 an additional distance beyond the rail 20 and is configured to hold a position magnet 130. According to the illustrated embodiment, the second segment 120 of the top member 104 includes a first portion 122 extending generally parallel to the rail 20 and tapering to a smaller width than the first segment 103 of the top member 104. The second segment 120 also includes a second portion 124 extending downward from and generally orthogonal to the first portion 122. The second portion 124 extends downward a distance less than the distance to the upper surface 11 of the track segment but of sufficient distance to have the position magnet 130 mounted thereto. According to the illustrated embodiment, a position magnet 130 is mounted within a recess 126 on the second portion 124 and is configured to align with a sensor 150 mounted within the top surface 11 of the track segment.

With reference again to FIG. 7, a second embodiment of an exemplary mover 100 is illustrated. Each mover 100 includes a side member 102, a top member 104, and a bottom member 106. The side member 102 extends for a height at least spanning a distance between the rail 20 on the top surface 11 of the track 10 and the rail 20 on the bottom surface 13 of the track 10 and is oriented generally parallel to a side surface 21 when mounted to the track 10. The top member 104 extends generally orthogonal to the side member 102 at a top end of the side member 102 and extends across the rail 20 on the top surface 11 of the track 10. A first set of rollers 110 are mounted on the lower side of the top member 104 and are configured to engage either side of the first track portion 26 of the rail 20 mounted to the upper surface 11 of the track segment. According to the illustrated embodiment, two pairs of rollers 110 are mounted to the lower side of the top member 104 with a first pair located along a first side of the first track portion 26 and a second pair located along a second side of the first track portion 26 of the upper rail 20. A third pair of rollers 110 are mounted on the side member 102 and extend below the second track portion 28 of the upper rail. The bottom member 106 extends generally orthogonal to the side member 102 at a bottom end of the side member 102 and extends for a distance sufficient to receive a fourth and fifth pair of rollers 110 along the bottom of the mover 100. The fourth and fifth pair of rollers 110 each engage one side of the first track portion 26 of the lower rail 20. A sixth pair of rollers 110 are mounted on the side member 102 and extend above the second track portion 28 of the lower rail. The rollers 110 act together to engage the various surfaces of the rails 20 to both allow the mover 100 to travel along the rails 20 and to maintain the orientation of the mover 100 with respect to the track 10. According to the illustrated embodiment, a position magnet 130 is mounted within the top member 104 and is configured to align with a sensor 150 mounted within the top surface 11 of the track segment.

With reference to both FIGS. 5 and 7, a linear drive system is incorporated in part on each mover 100 and in part within each track segment 12, 14 to control motion of each mover 100 along the segment. Coils 50 (see also FIG. 8) mounted along the length of the track 10 serve as first drive members. Each mover 100 includes a second drive member 140 which is configured to interact with electromagnetic fields generated by the coils 50 to propel the mover 100 along the track 10. It is contemplated that the drive members 140 on each mover 100 may be drive magnets, steel back iron and teeth, conductors, or any other suitable member that will interact with the electromagnetic fields generated by the coils 50. Commonly, the drive member 140 on each mover 100 includes permanent magnets which emit a magnetic field. The magnetic field generated by the drive member 140 on each mover 100 improves the mover interaction with the electromagnetic field generated by the coils 50 in comparison to a magnetically salient structure that has no magnetic field. For convenience, the invention will be discussed with respect to drive magnets 140 being used as the drive member within each mover 100. However, it is understood that the other magnetically salient structures may be employed without deviating from the scope of the invention.

Figure 8:
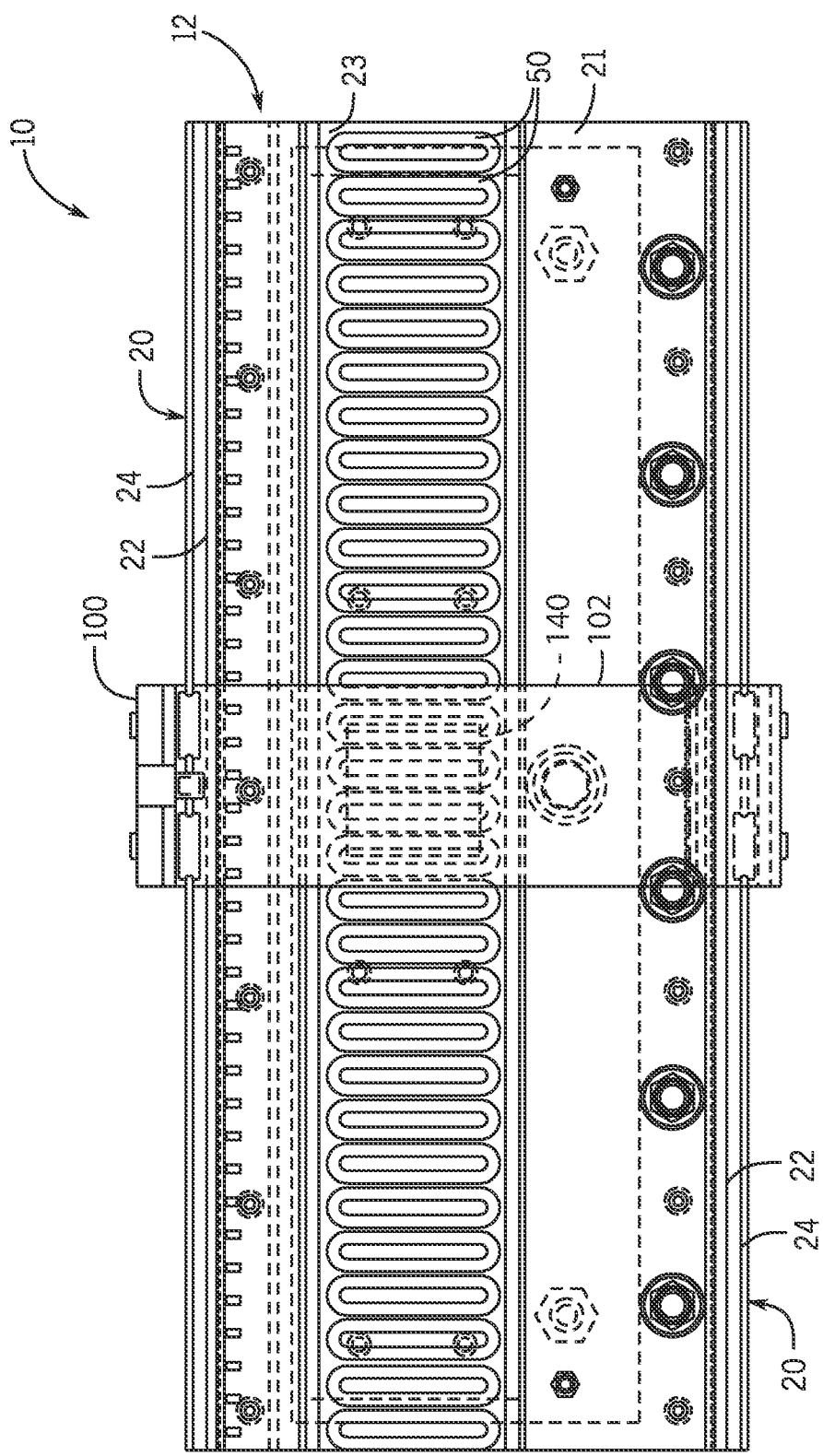
FIG. 8 is a partial side elevation view of one segment of one embodiment of the independent cart system of FIG. 1 illustrating activation coils distributed along one surface of the track segment.

With reference to FIG. 8, a series of coils 50 are positioned along the length of the track 10. Each mover 100 includes at least one drive magnet 140 configured to interact with an electromagnetic field generated in the coils. Successive activation of the coils 50 establishes a moving electromagnetic field that interacts with the magnetic field generated by each permanent magnet 140 mounted on the movers 100 and that causes the mover 100 to travel along the track 10. Controlled voltages are applied to each coil 50 to achieve desired operation of the movers. The drive magnets 140 are mounted on the inner surface of the side member 102 and when mounted to the track 10 are spaced apart from a series of coils 50 extending along the track 10. As shown in FIGS. 5 and 7, an air gap 141 is provided between each set of drive magnets 140 and the coils 50 along the track 10. According to the illustrated embodiment, each coil 50 is placed in a channel 23 extending longitudinally along one surface of the track segment 12. The electromagnetic field generated by each coil 50 spans the air gap 141 and interacts with the drive magnets 140 mounted to the mover 100 to control operation of the mover 100.

Figure 9:
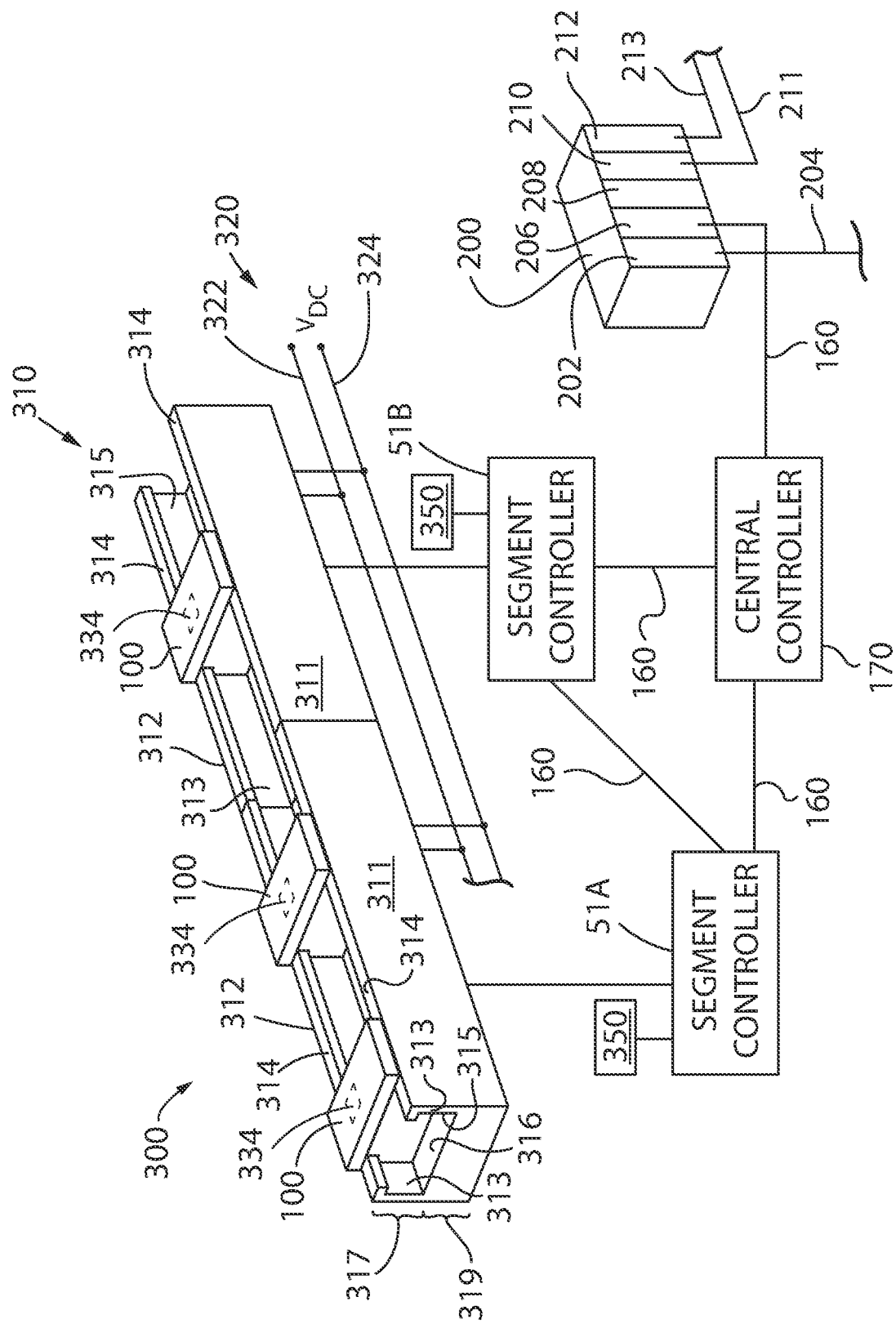
FIG. 9 is an exemplary control system for an independent cart system incorporating one embodiment of the present invention.

Turning next to FIG. 9, a portion of another exemplary independent cart transport system for moving articles or products is illustrated. The illustrated system includes a track 310 made up of multiple segments 312. Rather than traveling along the sides of the track, as shown in FIG. 1, the illustrated movers 100 travel along a channel in the track 310. The channel is defined by a bottom surface 316 and a pair of opposing side walls 313. Rails 314 are placed along the length of the upper surface of each side wall 313 and are configured to support and engage the mover 100 as it travels along the track 310. Power is delivered to segments 312 via a DC bus 320 extending along the track 310. The DC bus 320 includes a positive rail 322 and a negative rail 324 where any suitable voltage potential is provided between the positive and negative rails to energize the coils 50.

The portion of the system illustrated in FIG. 9 includes two straight segments 312 and further illustrates an exemplary control system connected to the independent cart transport system. A segment controller 51 is provided within each track segment 312 to regulate current flow to the coils 50 forming the portion of the linear drive system in each track segment 312. Optionally, each segment controller 51 may also be responsible for all, or a portion of, the motion control of each mover 100 as it travels along the corresponding segment 312. According to one embodiment of the invention, the segment controllers 51 may be mounted together in a control cabinet. A cable, multiple cables, separate conductors, or a combination thereof extend from the control cabinet to each segment 12, 14 to deliver current to the coils 50 and to receive feedback signals, for example, from position sensors 150. In smaller systems, each segment controller 51 and an industrial controller 200 may be included in a single control cabinet. Depending on the size and layout of the track 10, additional control cabinets may be distributed around the track and a portion of the segment controllers 51 located in a control cabinet proximate the track segment 12, 14 they control. Separate control cabinets and controllers within a cabinet are communicatively connected via the network medium 160. Although illustrated as blocks in FIG. 9 external to the track segments 312, the illustration is to facilitate illustration of interconnects between controllers. According to still another embodiment, it is contemplated that each segment controller 51 may be mounted in the lower portion 319 of the track segment 312. Each segment controller 51 is in communication with an adjacent segment controller 51 and a central controller 170 which is, in turn, in communication with an industrial controller 200. According to yet another embodiment, the central controller 170 may be removed and the functions of the central controller 170 incorporated into the segment controllers 51, the industrial controller 200, or a combination thereof, and each segment controller 51 may communicate directly with the industrial controller 200.

The industrial controller 200 may be, for example, a programmable logic controller (PLC) configured to control elements of a process line stationed along the track 10. The process line may be configured, for example, to fill and label boxes, bottles, or other containers loaded onto or held by the movers 100 as the travel along the line. In other embodiments, robotic assembly stations may perform various assembly and/or machining tasks on workpieces carried along by the movers 100. The exemplary industrial controller 200 includes: a power supply 202 with a power cable 204 connected, for example, to a utility power supply; a communication module 206 connected by a network medium 160 to the other controllers 51, 170; a processor module 208; an input module 210 receiving input signals 211 from sensors or other devices along the process line; and an output module 212 transmitting control signals 213 to controlled devices, actuators, and the like along the process line. The processor module 208 may identify when a mover 100 is required at a particular location and may monitor sensors, such as proximity sensors, position switches, or the like to verify that the mover 100 is at a desired location. The processor module 208 transmits the desired locations of each mover 100 to a central controller 170 or to the respective segment controllers 51 where the receiving controller operates to generate commands for the current required in each coil 50 of the corresponding segment controller 51 to control motion of each mover 100. Optionally, the industrial controller 200 may include a module in one of the slots of the chassis or embedded as a routine executing within the processor module 208 to perform a portion of the command generation and the processor module 208 may transmit a current command to a segment controller rather than a desired location.

Figure 10:
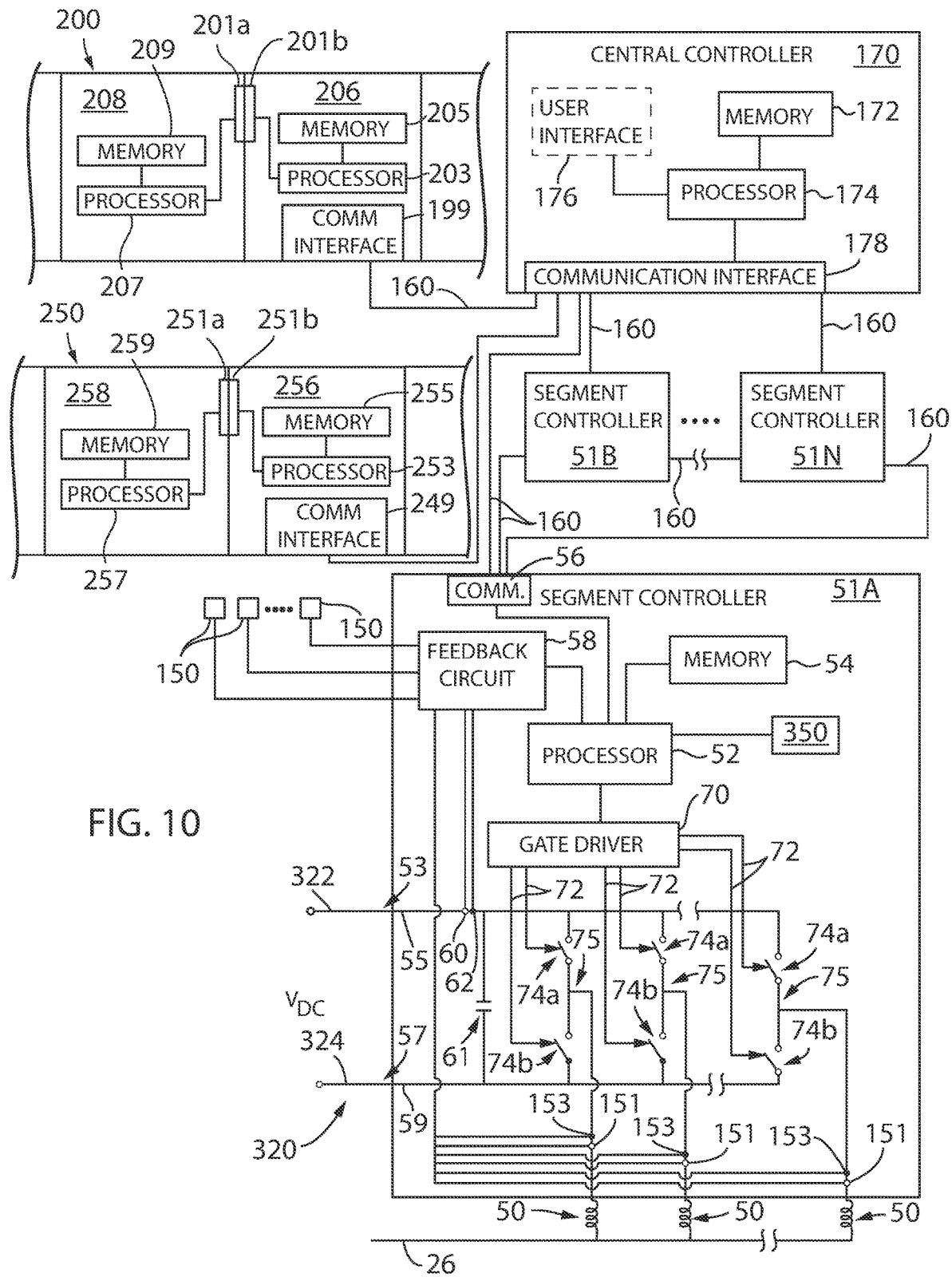
FIG. 10 is a block diagram representation of the control system of FIG. 9.

With reference also to FIG. 10, each module in the industrial controller 200 may include its own memory and processor and be configured to execute one or more routines corresponding to the desired operation of the respective module. The portion of the industrial controller illustrated in FIG. 10, shows a first processor 207 and a first memory device 209 located in the processor module 208 and a second processor 203 and a second memory 205 located in the communication module 206. A backplane connects each module within the industrial controller 200 and backplane connectors 201a, 201b are shown connecting the two modules. Although illustrated as directly connecting the two modules, the backplane is a communication bus extending along the chassis of the industrial controller and each backplane connector 201 for a module engages a complementary backplane connector on the communication bus aligned with the slot on the chassis in which the module is inserted. A communication interface 199 within the communication module 206 is configured to connect to the industrial network 160.

The central controller 170 includes a processor 174 and a memory device 172. It is contemplated that the processor 174 and memory device 172 may each be a single electronic device or formed from multiple devices. The processor may be a microprocessor. Optionally, the processor 174 and/or the memory device 172 may be integrated on a field programmable gate array (FPGA) or an application specific integrated circuit (ASIC). The memory device 172 may include volatile memory, non-volatile memory, or a combination thereof. An optional user interface 176 may be provided for an operator to configure the central controller 170 and to load or configure desired motion profiles for the movers 100 on the central controller 170. Optionally, the configuration may be performed via a remote device connected via a network and a communication interface 178 to the central controller 170. It is contemplated that the central controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the central controller 170 and user interface may be an industrial computer mounted within a control cabinet and configured to withstand harsh operating environments. It is contemplated that still other combinations of computing devices and peripherals as would be understood in the art may be utilized or incorporated into the central controller 170 and user interface 176 without deviating from the scope of the invention.

The central controller 170 includes one or more programs stored in the memory device 172 for execution by the processor 174. The central controller 170 can receive instructions for coordinating with industrial processes or machines. In one aspect, known as "centralized" control, the central controller 170 can determine one or more motion profiles for the movers 100 to follow along the track 10. A program executing on the processor 174 is in communication with each segment controller 51 on each track segment via a network medium 160. The central controller 170 may transfer a command signal to the segment controller 51 in each track segment to control energization of the coils 50. The central controller 170 may receive feedback signals corresponding to the identification and/or location of movers 100 along each track segment and control motion of the movers 100 directly from the central controller 170. In one embodiment of the invention, it is contemplated that the central controller 170 may be implemented within the industrial controller 200 as either a portion of the control program executing in the processor module 208 or as a dedicated motion control module inserted within one of the slots of the industrial controller 200.

In another aspect, known as "distributed" control, the central controller 170 may be configured to transfer the desired motion commands, or a portion thereof, from the central controller 170 to each of the segment controllers 51. The motion commands identify one or more desired movers 100 to be positioned at or moved along each track segment 312. The central controller 170 may distribute motion commands to each segment controller 51 according to the mover 100 located at or proximate to the track segment 312. The corresponding segment controller 51 for each track segment 312 may, in turn, determine the appropriate command signals for each mover 100 and transmit the command signals to one or more power segments in each track segment to control energization of the coils 50. Distributed control can minimize the amount of communication in the system by allowing segment controllers 51, rather than the central controller 170, to control driving each mover 100 along the track 310. In one embodiment of the invention, it is contemplated that the central controller 170 may be implemented within the industrial controller 200 as either a portion of the control program executing in the processor module 208 or as a dedicated motion control module inserted within one of the slots of the industrial controller 200.

A position feedback system provides knowledge of the location of each mover 100 along the length of the track segment 12, 14 to the segment controller 51. In one embodiment, the position feedback system can include one or more position magnets 130 mounted to the mover 100 and an array of sensors 150 spaced along the track segment 12, 14. With reference again to FIG. 1, for convenience, only a few position sensors 150 are illustrated along one track segment 12. It is contemplated that the position sensors 150 would continue along each track segment 12, 14 and for the entire length of the track 10. The sensors 150 are positioned such that each of the position magnets 130 are proximate to the sensor as the mover 100 passes each sensor 150. The sensors 150 are a suitable magnetic field detector including, for example, a Hall Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 150 outputs a feedback signal provided to the segment controller 51 for the corresponding track segment 12 on which the sensor 150 is mounted. The feedback signal may be an analog signal provided to a feedback circuit 58 which, in turn, provides a signal to the processor 52 which corresponds to the magnet 130 passing the sensor 150.

The segment controller 51 also includes a communication interface 56 that receives communications from the central controller 170, from adjacent segment controllers 51 in a path, and the industrial controller 200. The communication interface 56 extracts data from the message packets on the communication network and passes the data to a processor 52 executing in the segment controller 51. The processor may be a microprocessor. Optionally, the processor 52 and/or a memory device 54 within the segment controller 51 may be integrated on a field programmable gate array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 51 receives the motion profile or desired motion of the movers 100 and utilizes the motion commands to control movers 100 along the track segment 312 controlled by that segment controller 51.

Each segment controller 51 generates switching signals to generate a desired current and/or voltage at each coil 50 in the track segment 312 to achieve the desired motion of the movers 100. The switching signals 72 control operation of switching devices 74 for the segment controller 51. According to the illustrated embodiment, the segment controller 51 includes a dedicated gate driver module 70 which receives command signals from the processor 52, such as a desired voltage and/or current to be generated in each coil 50 and generates switching signals 72. Optionally, the processor 52 may incorporate the functions of the gate driver module 70 and directly generate the switching signals 72. The switching signals 72 are provided to the power conversion segment in each track segment 312, where each power conversion segment includes multiple power switching devices 74. The switching devices 74 may be a solid-state device that is activated by the switching signal, including, but not limited to, transistors, thyristors, or silicon-controlled rectifiers.

In one embodiment, the processor 52 can also receive feedback signals from sensors providing an indication of the current operating conditions within the power segment or of the current operating conditions of a coil 50 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 322. The segment controller 51 also receives feedback signals corresponding to the operation of coils 50 connected to the power segment. A voltage sensor 153 and a current sensor 151 are connected in series with the coils 50 at each output of the power section. The voltage sensor 153 generates a voltage feedback signal and the current sensor 151 generates a current feedback signal, where each feedback signal corresponds to the operating condition of the corresponding coil 50. The processor 52 executes a program stored on the memory device 54 to regulate the current and/or voltage supplied to each coil and the processor 52 and/or gate driver 70 generate switching signals 72 which selectively enable/disable each of the switching devices 74 to achieve the desired current and/or voltage in each coil 50. The energized coils 50 create an electromagnetic field that interacts with the drive magnets 140 on each mover 100 to control motion of the movers 100 along the track segment 12.

Figure 11:
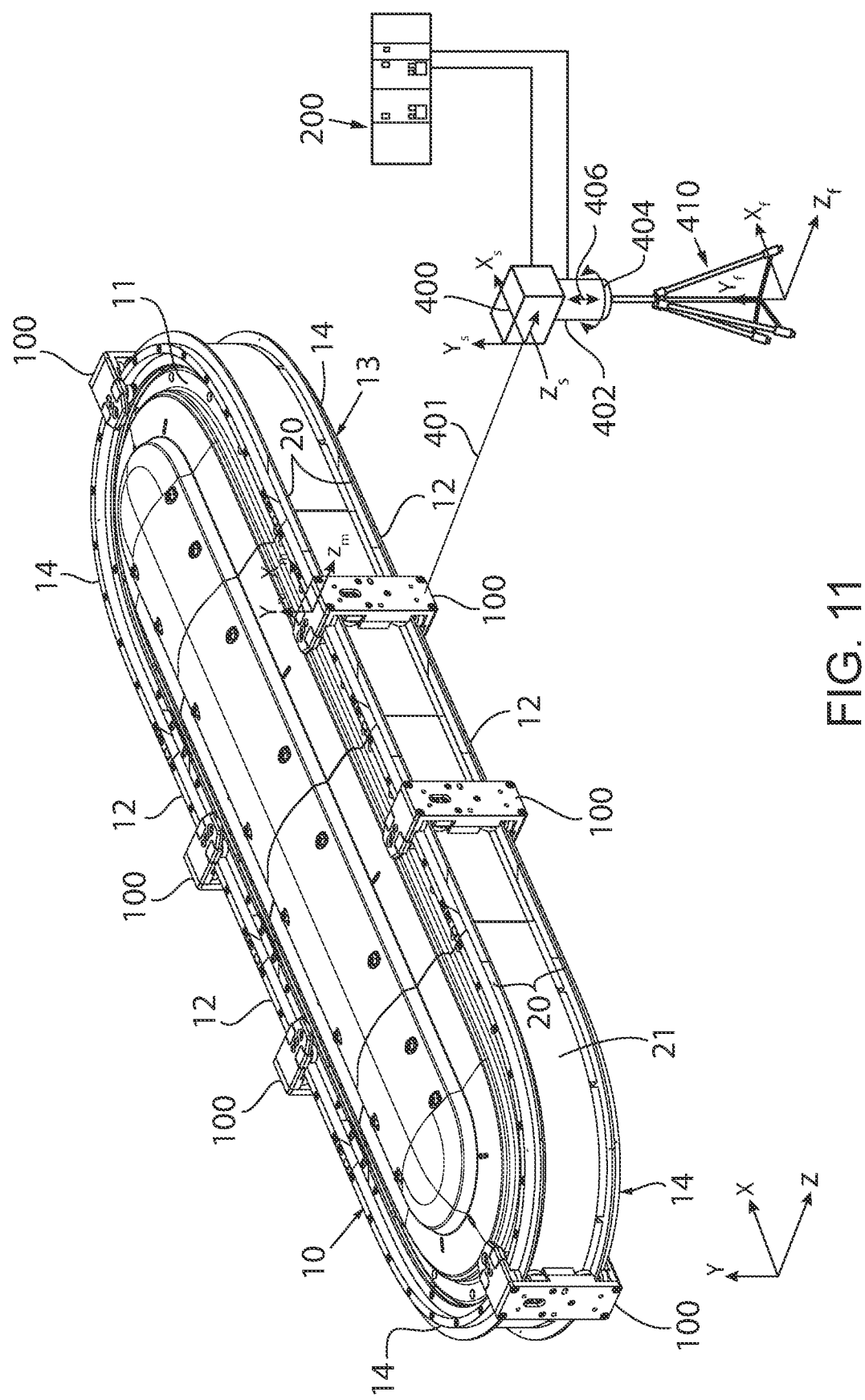
FIG. 11 is a partial perspective view of one embodiment of a contactless sensor incorporated into the independent cart system of FIG. 2.

Turning next to FIG. 11, a first embodiment of a sensing device 400 configured to monitor performance of the independent cart system is illustrated. According to one embodiment of the invention, the sensing device 400 includes a transmitter configured to emit a signal 401 toward a mover 100 on the track 10. The signal 401 reflects off of the mover 100. It is contemplated that the signal 401 may reflect in multiple directions, but at least a portion of the signal is reflected back toward the sensing device 400. The signal 401 may be any suitable signal to provide contactless sensing of the mover 100 including, but not limited to, a laser beam, an ultrasound beam, an infrared beam, a radio frequency (RF) beam, or a microwave beam. According to another embodiment of the invention, the sensing device 400 may be a high-speed camera and obtain images of the mover 100 as it travels along the track 10. The high-speed camera may not emit any signal or, optionally, may emit light to illuminate the mover 100. The sensing device 400 includes a receiver configured to detect the signal 401, or portion thereof, that is reflected off of the mover 100. A transducer within the sensing device 400 converts the portion of the signal 401 detected at the receiver into a feedback signal. The feedback signal may, in turn, be provided to the industrial controller 200 for further processing.

The sensing device 400 is mounted on an actuator 402 configured to adjust the orientation of the sensing device 400. The actuator 402 is configured to move the sensing device 400 or to pivot the sensing device such that the transmitter and receiver change orientation along at least one axis of motion. According to the illustrated embodiment, the actuator 402 may rotate in an arc 404 about an axis causing the face of the sensing device 400 to pivot along the direction of travel of the movers 100. Optionally, the actuator 402 may also be configured to raise or lower the sensing device along a horizontal axis 406 such that the signal 401 emitted from the sensing device 400 may be adjusted to engage the mover 100 at different heights and/or to engage or detect a load mounted on the mover 100. The actuator 406 receives command signals from the industrial controller 200 and orients the sensing device 400 responsive to receiving the command signals. The actuator 406 may also include, for example, position sensors generating feedback signals to the industrial controller 200 corresponding to the present orientation of the actuator and, in turn, the present orientation of the sensing device 400. The actuator 406 may be further configured to pivot in multiple axes, for example, rotating up and down or laterally, such that the sensing device 400 may be oriented in three dimensions to face one of the movers.

Figure 12:
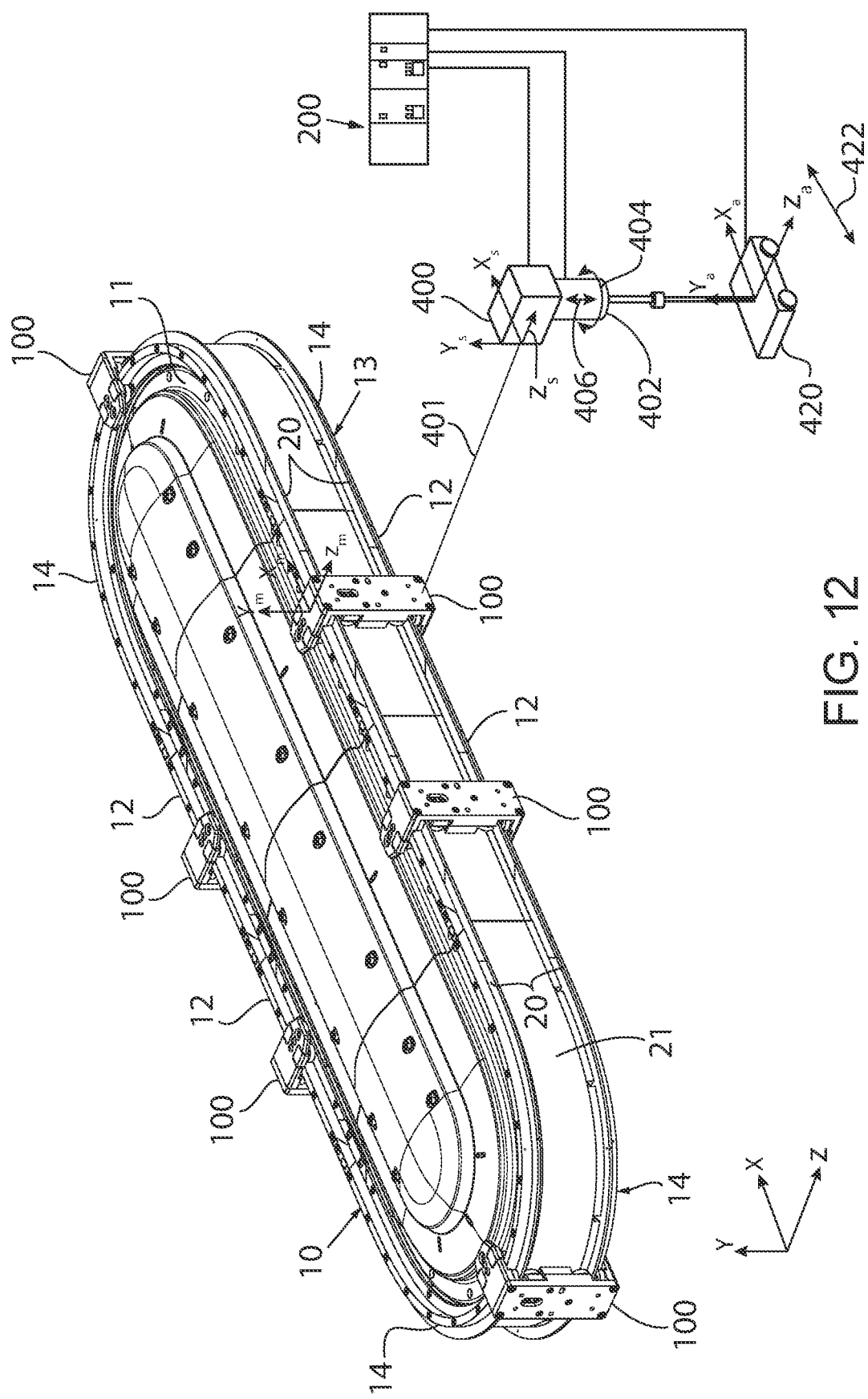
FIG. 12 is a partial perspective view of another embodiment of a contactless sensor incorporated into the independent cart system of FIG. 2.

According to the embodiment illustrated in FIG. 11, the sensing device 400 is mounted on a tripod 410 at a fixed position. The sensing device 400 may initially be oriented in a desired position and then monitor operation of the movers 100. Optionally, the sensing device 400 may be affixed to another rigid mount according to application requirements, such as a post embedded into the floor or to structural steel of the building or frame of the independent cart system. Mounting the sensing device 400 in a fixed position provides a known reference frame, as illustrated by the $X_f$, $Y_f$, and $Z_f$ axes, at which the sensing device 400 is located. A second reference frame may also be defined for the sensing device 400 corresponding to the location of the receiver, as illustrated by the $X_s$, $Y_s$, and $Z_s$ axes. The origin of the fixed reference frame may be offset by a known amount from the origin of the sensing reference frame. Alternately, the origin of the fixed reference frame and the origin of the sensing reference frame may vary as the actuator 402 adjusts the position of the sensing device. The industrial controller 200 may include a table defining relationships between different reference frames such that measurements taken in one reference frame, as determined from the feedback signal from the actuator, may be translated into another reference frame as desired. Turning next to FIG. 12, it is contemplated that the sensing device 400 may be mounted to a mobile platform 420. The mobile platform may define an actuator reference frame, as illustrated by the $X_a$, $Y_a$, and $Z_a$ axes, and be controlled by the industrial controller 200. The mobile platform 420 may be configured to move along in a direction 422 parallel to the motion of the movers 100 along the track, and the mobile platform 420 may be configured to move in tandem with the motion of one of the movers 100 such that the sensing device 400 is similarly moved in tandem with the mover. Although illustrated as a wheeled platform traveling in a single direction 422, it is contemplated that the mobile platform 420 may be configured to move in multiple directions. The mobile platform 420 may, for example, travel to either side of the illustrated track or follow a mover 100 traveling along a curve. It is further contemplated that the mobile platform 420 may be configured to move in a suspended manner rather than traveling along the ground. The mobile platform 420 may be, for example, suspended from a cable or along a parallel track. It is further contemplated that the mobile platform may be a drone configured to position the sensing device 100 in any desired position about the mover 100 and track 10 being observed.

Figure 13A:
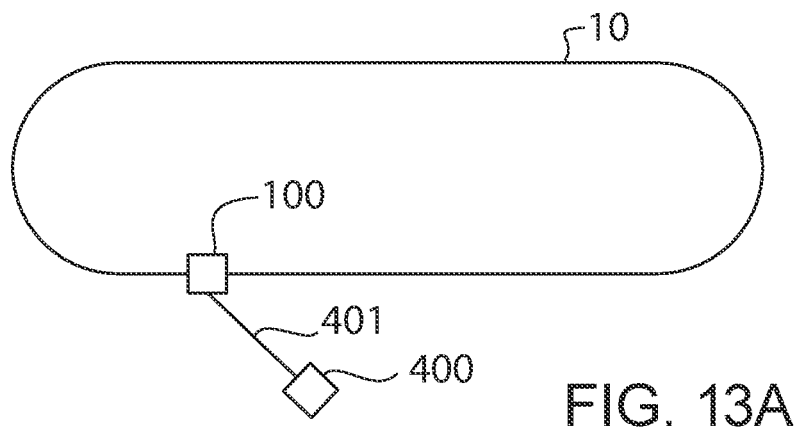
FIG. 13A is a block diagram representation of the contactless sensor of FIG. 11 monitoring a single mover located in a first position along a track of the independent cart system.
Figure 13B:
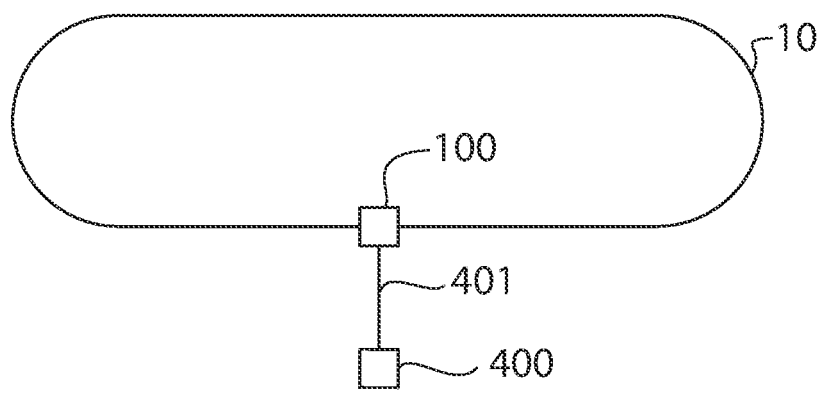
FIG. 13B is a block diagram representation of the contactless sensor of FIG. 11 monitoring a single mover located in a second position along a track of the independent cart system.
Figure 13C:
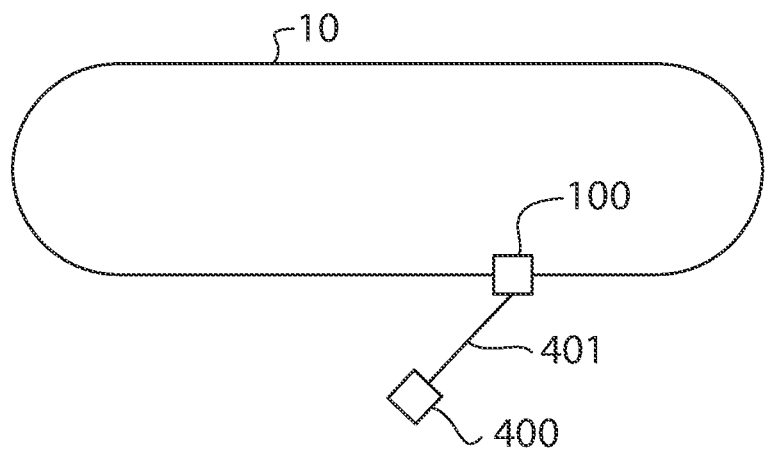
FIG. 13C is a block diagram representation of the contactless sensor of FIG. 11 monitoring a single mover located in a third position along a track of the independent cart system.

In operation, the sensing device 400 may be controlled by the industrial controller 200 to detect a number of different operating conditions of the independent cart system. With reference next to FIGS. 13A-13C, the sensing device 400 may be configured to monitor operation of a single mover 100 as it travels along the track 10. In FIG. 13A, the mover 100 is located at a position to the front and left of the sensing device 400. In FIG. 13B, the mover 100 is located at a position centrally in front of the sensing device 400. In FIG. 13C, the mover 100 is located at a position to the front and right of the sensing device 400. The actuator 406 is configured to rotate the sensing device as the mover 100 travels along the track from the first position in FIG. 13A to the second position in FIG. 13B and on to the third position in FIG. 13C. Throughout the time the sensing device 400 is tracking the mover 100, the sensing device 400 emits the signal 401 from its transmitter and detects the portion of the signal 401 reflected off the mover 100 that is incident on the receiver of the sensing device 400.

According to one embodiment of the invention, it is contemplated that the signal 401 being emitted from the sensing device 400 is a laser. The sensing device 400 may include a chamber with a pair of opposing mirrors between which the laser beam is reflected at a known wavelength. A portion of the laser beam is emitted from the chamber via the transmitter toward the mover 100. When the laser beam hits the mover 100, the light is reflected in all directions. A portion of the laser beam hitting the mover 100 is reflected back to the receiver of the sensing device 400 and enters the chamber in which the laser beam is being reflected back and forth between the opposing mirrors. The reflected light incident on the receiver causes a shift in the wavelength of the laser beam within the chamber. This shift in wavelength may be used to determine a distance between the sensing device 400 and the mover 100. Small variations in the measured distance may indicate vibration of the mover 100 as the mover 100 travels along the track 10. It is contemplated that the sensing device 400 may be configured to perform some initial processing on the feedback signal resulting from the reflected light incident on the receiver. The sensing device 400 may output a feedback signal corresponding to changes in the wavelength or to the vibration detected on the mover 100. Optionally, the feedback signal may correspond directly to the measured wavelength and the industrial controller 200 receiving the feedback signal may determine the vibration on the mover 100. Other such signals, such as ultrasound, infrared, microwave, RF, and the like may be transmitted toward the mover 100 and reflected portions detected to determine vibration of the mover. In some applications, it may be desirable to mount a target on the mover 100, where the target is configured to disperse the signal 401 in multiple directions such that at least a portion of the signal transmitted from the sensing device 400 is reflected back toward the sensing device.

Figure 15A:
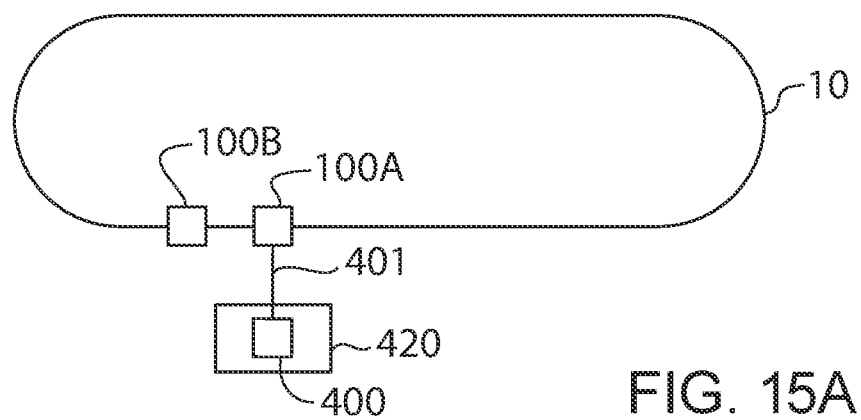
FIG. 15A is a block diagram representation of the contactless sensor of FIG. 12 monitoring a single mover located in a first position along a track of the independent cart system.
Figure 15B:
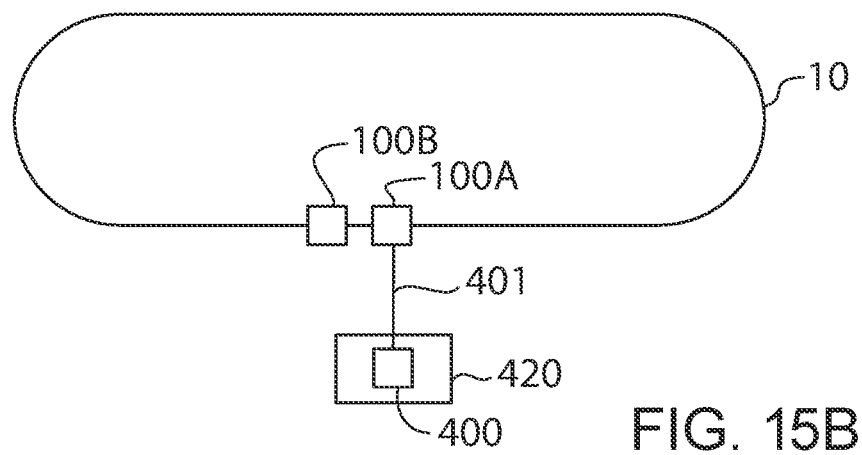
FIG. 15B is a block diagram representation of the contactless sensor of FIG. 12 monitoring a single mover located in a second position along a track of the independent cart system.
Figure 15C:
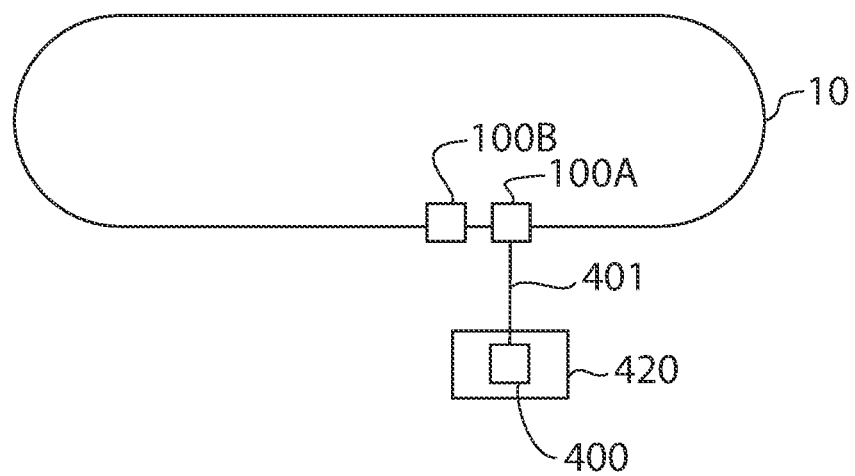
FIG. 15C is a block diagram representation of the contactless sensor of FIG. 12 monitoring a single mover located in a third position along a track of the independent cart system.

In other applications, it may be desirable to maintain a perpendicular relationship between the sensing device 400 and the mover 100 to maximize the amount of the signal 401 that is reflected from the mover 100 towards the sensing device. In such an application, the sensing device 400 may be mounted to the mobile platform, as shown in FIG. 12. With reference also to FIGS. 15A-15C, the mobile platform may be moved from left to right in tandem with the mover 100 and the sensing device 400 may maintain an orientation where the mover 100 is located at a position centrally in front of the sensing device 400 as the mover 100 travels along the track 10. FIGS. 15A-15C illustrate two movers 100A, 100B traveling along the track 10, and the sensing device 400 tracks the first mover 100A. In FIG. 15A, the first mover 100A is at a leftmost position (with respect to the three figures), and the platform 420 is positioned such that the sensing device 400 is transmitting the signal 401 orthogonally at the mover 100A. In FIG. 15B, the first mover 100A is at a center position (with respect to the three figures), and the platform 420 is again positioned such that the sensing device 400 is transmitting the signal 401 orthogonally at the mover 100A. In FIG. 15C, the first mover 100A is now at a rightmost position (with respect to the three figures), and the platform 420 is still positioned such that the sensing device 400 is transmitting the signal 401 orthogonally at the mover 100A.

The industrial controller 200 is configured to control the actuator 402 and/or the mobile platform 420 to maintain the desired relationship between the sensing device 400 and the mover 100. The industrial controller 200 may also be configured to generate the motion profiles for the movers 100 and, therefore, already have knowledge of the motion profiles. Optionally, the industrial controller 200 may receive the motion profile via the industrial network 160 from another controller which is generating the profile. According to still another aspect of the invention, the industrial controller 200 is in communication with the segment controllers 51 and/or the central controller 170 vi the industrial network 160. The segment controllers 51 in a distributed control configuration or the central controller 170 in a central configuration generate motion profiles for the movers 100. The industrial controller 200 may be configured to utilize these motion profiles directly to control motion of the actuator 402. The segment controllers 51 and/or the central controller 200 may transmit the motion profiles generated for a mover 100 to the industrial controller 200, configured to control the actuator, for use in controlling the motion of the actuator. Thus, a single motion profile may be shared by the mover 100 and actuator 402 to facilitate synchronized motion between the mover and actuator. The industrial controller 200 controls the actuator 402 in FIG. 11 to pivot the sensing device 400, as shown in FIGS. 13A-13C, to track the mover 100 as it travels along the track 10. Similarly, the industrial controller 200 controls the mobile platform 420 in FIG. 12 to translate the sensing device 400 parallel to the mover 100, as shown in FIGS. 15A-15C, to track the mover 100 as it travels along the track 10.

Figure 14A:
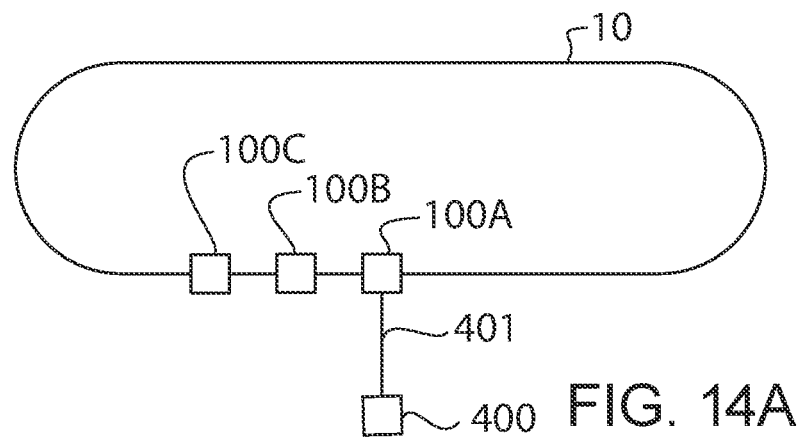
FIG. 14A is a block diagram representation of the contactless sensor of FIG. 11 monitoring a first mover traveling along a track of the independent cart system.
Figure 14B:
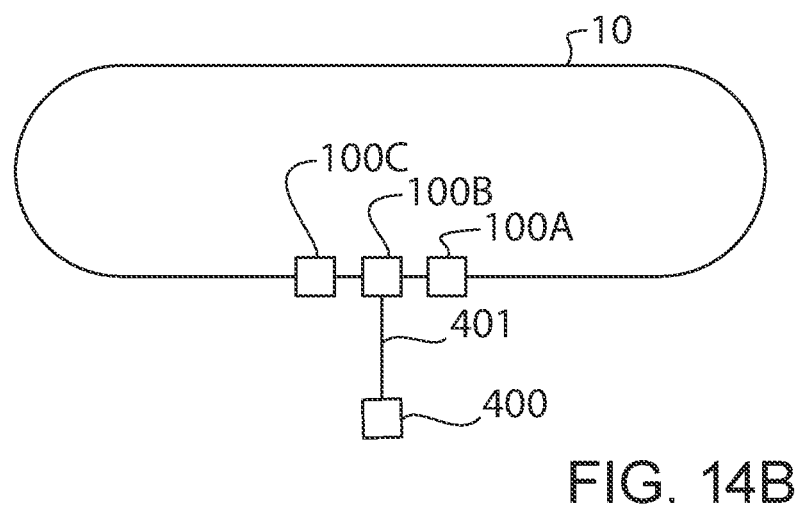
FIG. 14B is a block diagram representation of the contactless sensor of FIG. 11 monitoring a second mover traveling along a track of the independent cart system.
Figure 14C:
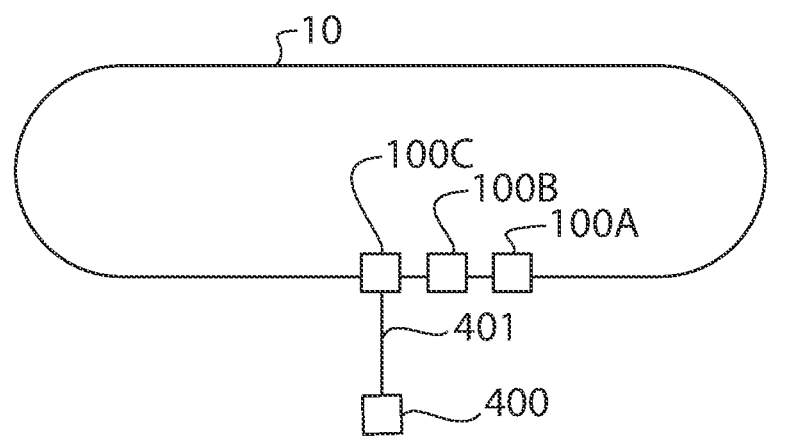
FIG. 14C is a block diagram representation of the contactless sensor of FIG. 11 monitoring a third mover traveling along a track of the independent cart system.

With reference next to FIGS. 14A-14C, the sensing device 400 may be configured to monitor operation of multiple movers 100 as they travel along the track 10. In FIG. 14A, a first mover 100A is located at a position centrally in front of the sensing device 400. In FIG. 14B, a second mover 100B is located at a position centrally in front of the sensing device 400. In FIG. 14C, a third mover 100C is located at a position centrally in front of the sensing device 400. In each instance, the sensing device 400 may be configured to detect a leading edge and a trailing edge of each mover 100. Having stored a value of the width of the mover 100, the sensing device may determine an amount of time required for the mover 100 to travel past the sensing device 400. The amount of time and the width of the mover may be used to generate a feedback signal corresponding to a speed of travel of the mover 100. Optionally, the feedback signal may correspond directly to the reflected light incident on the receiver of the sensing device 400 and the industrial controller 200 may determine a speed of travel of the mover 100. This speed of travel may be utilized to verify correct operation of the position sensors 150 spaced along the track 10.

Figure 16A:
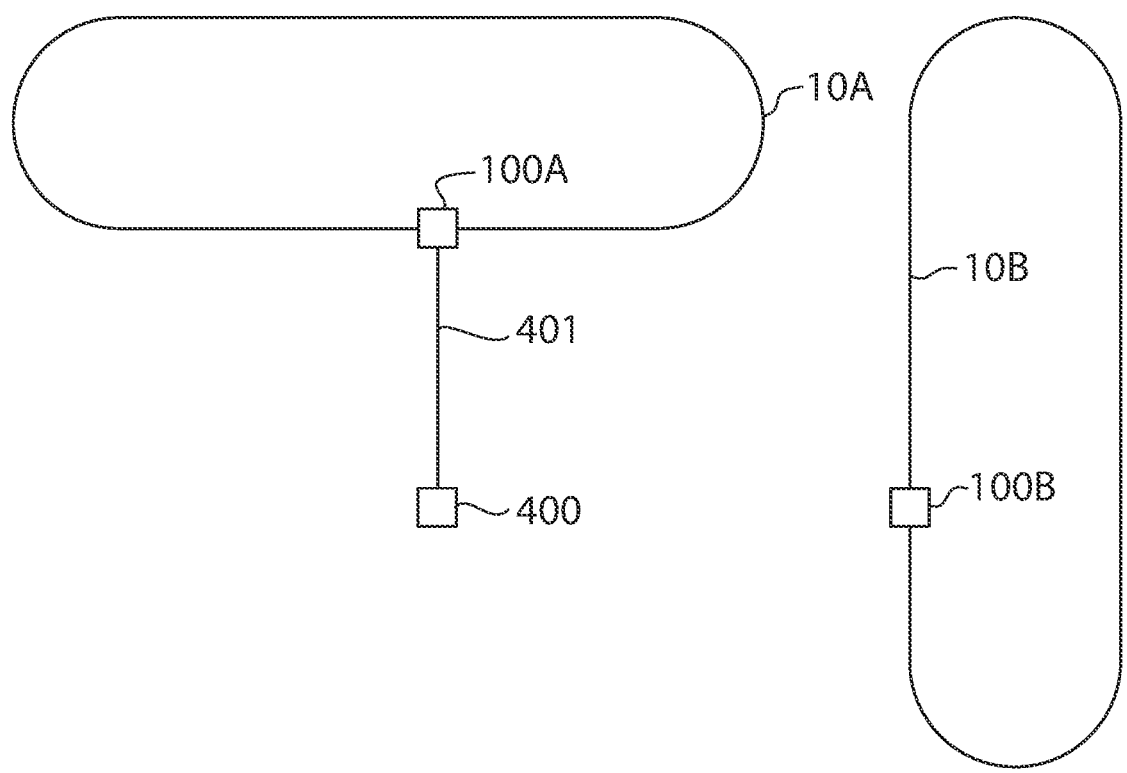
FIG. 16A is a block diagram representation of the contactless sensor of FIG. 11 monitoring a first mover located on a first track of the independent cart system.
Figure 16B:
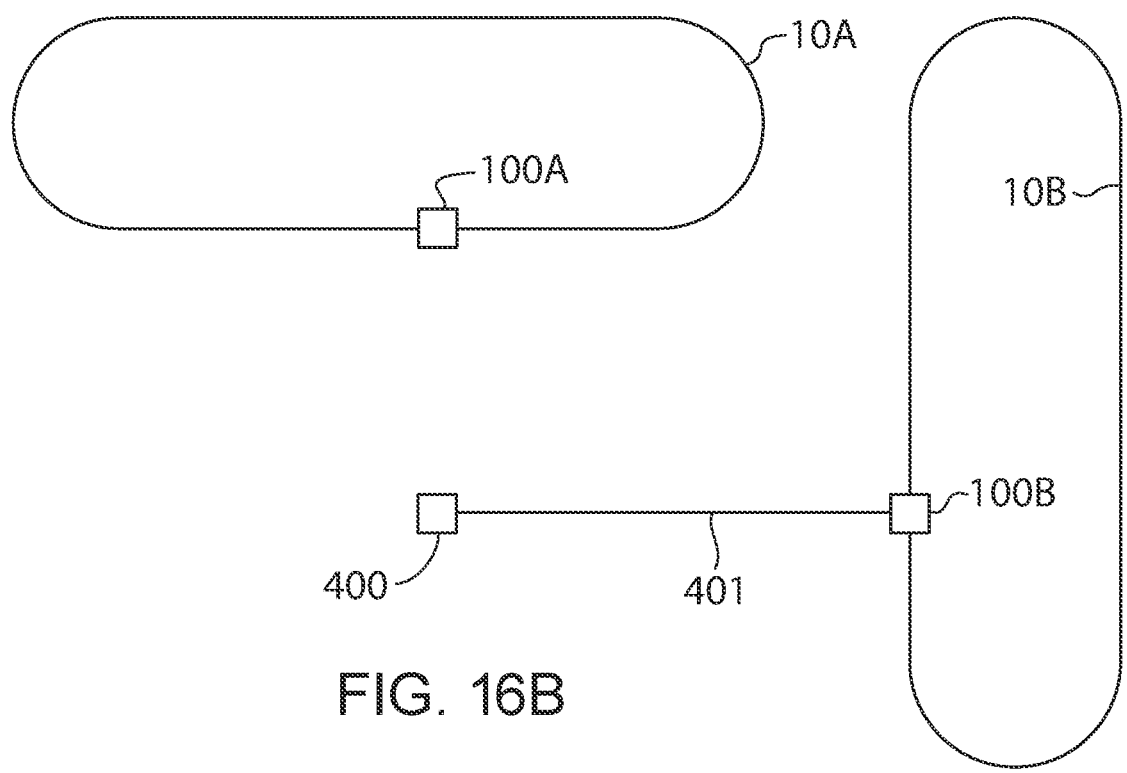
FIG. 16B is a block diagram representation of the contactless sensor of FIG. 11 monitoring a second mover located on a second track of the independent cart system.

With reference next to FIGS. 16A and 16B, the sensing device 400 may be configured to monitor operation of movers 100 on multiple tracks 10. According to the illustrated embodiment, a first track 10A includes a first mover 100A traveling along the track. A second track 10B includes a second mover 100B traveling along the track. It is contemplated that still additional tracks 10 may be positioned around the sensing device 400 or that multiple movers 100 may travel along any of the tracks 10. The industrial controller 200 generates command signals for the actuator 402 to selectively orient the sensing device toward either the first track 10A or the second track 10B. In FIG. 16A, the sensing device 400 is transmitting the signal 401 towards the first mover 100A on the first track 10A, and in FIG. 16B, the sensing device 400 is transmitting the signal 401 towards the second mover 100B on the second track 10B.

With reference again to FIGS. 13, 15, and 16, each figure illustrates the sensing device 400 tracking a single mover 100. The sensing device 400 may be reset to an initial position, as illustrated in the first image of each figure, and track additional movers as they travel through a detection region. In certain embodiments, additional movers 100 may travel closely behind the first mover. For example, FIG. 15C illustrates a second mover 100B following the first mover 100A being tracked at a spacing that is too close for the sensing device 400 to track over the entire detection region. In such an application, the sensing device 400 may track the first mover 100A on one pass and the second mover 100B on a second pass, alternating thereafter between movers. In still other embodiments, the sensing device 400 may track, for example every third mover, where the track 10 includes ten total movers. Each mover 100 then is tracked every third time around the track 10. Still other methods of scheduling the single sensing device 400 to track movers 100 may be employed such that one sensing device 400 may provide feedback on one mover, a portion of the movers, or on each of the movers in the independent cart system.

Having received a feedback signal from the sensing device 400, the industrial controller 200 may be configured to detect an operating condition of the independent cart system. As previously discussed, the sensing device 400 may provide a feedback signal corresponding directly to a measured value, such as the difference in wavelength of a laser beam reflected from the surface of a mover 100, or to a processed value, such as an amplitude of vibration present on the mover 100 as indicated by variations in the wavelength of the laser beam reflected from the surface of the mover. If a feedback signal is provided directly, the industrial controller 200 may execute instructions in a control program to convert the measured signal to a processed variable such as vibration. The measured signal and/or the processed signal may be stored in memory 209 of the industrial controller. During setup or during a subsequent learning run, a mover 100 may be commanded to travel along the track and one or more samples of the measured signal may be stored. During subsequent runs the measured signal and/or the processed signal may be compared to the stored values. If a difference between a newly measured value and an initial stored value exceeds a predefined threshold, the industrial controller 200 may generate a message indicating wear on the mover or on the track requires maintenance.

The industrial controller 200 may further be configured to compare measured and/or processed signals of different movers 100 against each other. The comparison may determine, for example, whether a mover or a track segment requires maintenance. Multiple movers 100 may be tracked over a single track segment 12. If one mover 100 generates a feedback signal or a processed signal that differs from corresponding feedback or processed signals of the other movers, the mover that differs may require maintenance. In contrast, if each of the movers 100 are tracked over multiple track segments 12 and each mover 100 generates a feedback or a processed signal that is approximately equal to the feedback or processed signals of the other movers 100 there would be no indication of a problem with a mover 100. However, if the measured or processed signals from all of the movers differ along one track segment than the measured or processed signals received along other track segments, the industrial controller 200 may generate a message indicating the track segment 12 that differs requires maintenance.

The industrial controller 200 may further be configured to compare measured and/or processed signals of different movers 100 against a predefined threshold. Rather than comparing signals to other stored signals, dynamics of the movers 100 and or expected performance along track segments 12 may be sufficiently well known that the industrial controller 200 has stored an expected value of the measured and/or processed signals to be received. Threshold values or a maximum deviation from the expected value may be stored in the industrial controller 200. When the industrial controller 200 detects a measured or processed signal exceeding the maximum value, a message may be generated to alert a technician of required maintenance.

The proposed sensing device 400 provides for a single, non-contact sensor that is able to detect performance of multiple movers 100 along the independent cart system. Even if power is able to be supplied to a mover 100, each mover 100 would require a separate sensing device and separate communication electronics to be mounted to the mover to provide for individual sensing of each mover. As the number of movers 100 present in the system increase, the expense for sensing hardware and for communication, similarly increases. In contrast, the present system allows for a single sensing device 400 to monitor performance of each mover 100 as it travels past the detection region of the sensing device.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. An apparatus for monitoring performance in an independent cart system, wherein the independent cart system includes a track and at least one mover, the apparatus comprising:
    a sensing device mounted remote from the track and remote from each of the at least one movers of the independent cart system, the sensing device configured to:
        transmit a signal toward the at least one mover as the at least one mover travels along the track of the independent cart system,
        receive the signal reflected from the at least one mover, and
        generate a feedback signal corresponding to the received signal;
    an actuator operatively connected to the sensing device to move the sensing device in at least one axis of motion; and
    a controller operative to control operation of the actuator in the at least one axis of motion such that the actuator moves the sensing device in coordination with the at least one mover as the at least one mover travels along the track.

2. The apparatus of claim 1, wherein the controller is further configured to generate a motion profile for the at least one mover.

3. The apparatus of claim 1, wherein either the sensing device or the controller is further configured to detect vibration of the at least one mover, speed of the at least one mover, or position of the at least one mover in response to the feedback signal.

4. The apparatus of claim 1, wherein the sensing device is selected from one of an optical sensor, an acoustic sensor, a microwave sensor, a radio frequency sensor, and a thermal sensor.

5. The apparatus of claim 1, wherein the actuator is mounted at a fixed position and is configured to pivot such that the at least one axis of motion is parallel to the track.

6. The apparatus of claim 1, further comprising a mobile platform on which the actuator is mounted, wherein the controller is configured to move the mobile platform in tandem with the at least one mover.

7. The apparatus of claim 1 wherein the controller is configured to:
    control the actuator to remain in one position, and
    receive the feedback signal corresponding to the signal reflected off a plurality of movers.

8. The apparatus of claim 1, wherein:
    the at least one mover includes a first mover and a second mover, and
    the sensing device is further configured to selectively transmit the signal toward either the first mover or the second mover as the first mover and the second mover travel along the track of the independent cart system.

9. The apparatus of claim 8 wherein the independent cart system includes a first track along which the first mover travels and a second track along which the second mover travels.

10. The apparatus of claim 8, wherein the sensing device is mounted remote from the independent cart system.

11. A method for monitoring performance in an independent cart system, wherein the independent cart system includes a track and at least one mover, the method comprising the steps of:
    receiving a signal at a sensing device mounted remote from the track and remote from each of the at least one movers of the independent cart system, wherein the signal corresponds to the at least one mover as the at least one mover travels along the track of the independent cart system;
    generating a feedback signal at the sensing device corresponding to the received signal; and
    controlling an actuator operatively connected to a sensing device, wherein the actuator is configured to move the sensing device in at least one axis of motion and wherein the actuator moves the sensing device in coordination with the at least one mover as the at least one mover travels along the track.

12. The method of claim 11 further comprising an initial step of transmitting the signal from the sensing device toward the at least one mover as the at least one mover travels along the track of the independent cart system and wherein the signal received at the sensing device is reflected from the at least one mover.

13. The method of claim 11, further comprising the step of generating a motion profile for the at least one mover with a controller, wherein the controller is also configured to control the actuator.

14. The method of claim 11, wherein the sensing device is selected from one of an optical sensor, an acoustic sensor, a microwave sensor, a radio frequency sensor, and a thermal sensor.

15. The method of claim 11, wherein the actuator is mounted at a fixed position and is configured to pivot such that the at least one axis of motion is parallel to the track.

16. The method of claim 11, wherein the actuator is a mobile platform, the method further comprising the step of controlling motion of the mobile platform in tandem with the at least one mover.

17. The method of claim 11, wherein the actuator is controlled to remain in one position, and wherein the signal received at the sensing device corresponds to a plurality of movers passing the sensing device.

18. The method of claim 11, wherein:
    the at least one mover includes a first mover and a second mover, and the signal received at the sensing device selectively corresponds to either the first mover or the second mover as the first mover and the second mover travel along the track of the independent cart system.

19. An apparatus for monitoring performance in an independent cart system, wherein the independent cart system includes a track, a first mover, and a second mover, the apparatus comprising:
- a sensing device configured to:
  - selectively transmit a signal toward either the first mover or the second mover as the first mover and the second mover travel along the track of the independent cart system,
  - receive the signal reflected from either the first mover or the second mover, and
  - generate a feedback signal corresponding to the received signal;
- an actuator operatively connected to the sensing device to move the sensing device in at least one axis of motion; and
- a controller operative to control operation of the actuator in the at least one axis of motion such that the actuator moves the sensing device in coordination with either the first mover and the second mover, according to which of the first mover and the second mover the sensing device is selectively transmitting the signal toward, as the first mover and the second mover travel along the track.

\* \* \* \* \*